United States Patent
Hirakata

(10) Patent No.: US 6,567,147 B1
(45) Date of Patent: May 20, 2003

(54) LIQUID CRYSTAL DISPLAY DEVICE AND METHOD OF FABRICATING THE SAME

(75) Inventor: Yoshiharu Hirakata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/046,691

(22) Filed: Mar. 24, 1998

(30) Foreign Application Priority Data

Mar. 27, 1997 (JP) ................................. 9-094608

(51) Int. Cl.⁷ ........................ G02F 1/1339; G02F 1/1333
(52) U.S. Cl. ........................ 349/153; 349/86; 349/155; 349/190; 349/187
(58) Field of Search ........................ 349/86, 153, 155, 349/190, 156, 187

(56) References Cited

U.S. PATENT DOCUMENTS

| | | |
|---|---|---|
| 3,600,061 A | 8/1971 | Heilmeier et al. |
| 4,023,259 A * | 5/1977 | Kubota et al. .............. 349/126 |
| 4,116,544 A * | 9/1978 | Soref .......................... 349/155 |
| 4,362,771 A | 12/1982 | Umeda et al. |
| 4,394,067 A | 7/1983 | Spruijt et al. |
| 4,688,074 A | 8/1987 | Iinuma |
| 4,688,900 A * | 8/1987 | Doane et al. ................ 349/20 |
| 4,826,297 A | 5/1989 | Kubo et al. |
| 5,076,667 A | 12/1991 | Stewart et al. |
| 5,130,832 A | 7/1992 | Kawaguchi et al. |
| 5,130,833 A | 7/1992 | Mase |
| 5,148,301 A | 9/1992 | Sawatsubashi et al. |
| 5,200,847 A | 4/1993 | Mawatari et al. |
| 5,247,375 A | 9/1993 | Mochizuki et al. |
| 5,278,682 A | 1/1994 | Niki |
| 5,278,685 A | 1/1994 | Iwamoto et al. |
| 5,379,139 A | 1/1995 | Sato et al. |
| 5,436,744 A | 7/1995 | Arledge et al. |
| 5,442,470 A | 8/1995 | Hashimoto |
| 5,460,983 A | 10/1995 | Hodges et al. |
| 5,517,344 A * | 5/1996 | Hu et al. ..................... 349/153 |
| 5,583,675 A * | 12/1996 | Yamada et al. ............. 349/155 |
| 5,710,612 A | 1/1998 | Mase |
| 5,724,110 A * | 3/1998 | Majima ....................... 349/86 |

FOREIGN PATENT DOCUMENTS

| | | |
|---|---|---|
| JP | 62-109026 | 5/1987 |
| JP | 62-240934 | 10/1987 |
| JP | 62-251723 | 11/1987 |
| JP | 64-49022 | 2/1989 |
| JP | 1-68725 | 3/1989 |
| JP | 4-78819 | 3/1992 |
| JP | 4-116623 | 4/1992 |
| JP | 4-133029 | 5/1992 |
| JP | 4-355433 | 12/1992 |
| JP | 5-066413 | 3/1993 |
| JP | 5-203977 | 8/1993 |
| JP | 6-186579 | 7/1994 |
| JP | 6-186580 | 7/1994 |

OTHER PUBLICATIONS

*Chapter 3 Panel Assembling Technique Scriber/Cell Breaking Device,* JKL–454F Joyo Engineering Technical Laboratory, p. 272, Published Oct. 1, 1992, Including English Translation Thereof.
*Sealing Structure for Liquid Crystal Display,* IBM Technical Disclosure Bulletin, vol. 32, No. 5A, Oct., 1989.

* cited by examiner

Primary Examiner—Tarifur R. Chowdhury
(74) Attorney, Agent, or Firm—Eric J. Robinson; Robinson Intellectual Property Law Office, P.C.

(57) ABSTRACT

In an active matrix type liquid crystal display in which pixel TFTs and driver circuit TFTs are integrally formed on the same substrate, a cell gap is controlled by a gap retaining material formed in such a manner that a liquid crystal material is confined only in a pixel region. By this, it is possible to obtain a uniform cell thickness over whole of the liquid crystal display device and prevent the liquid crystal material from entering into driver circuit regions. Further, since unnecessary insulating layer, etc. on the driver circuit TFTs are removed, load capacitances on the driver circuits becomes small and it is possible to suppress crosstalk.

15 Claims, 17 Drawing Sheets

LIQUID CRYSTAL DISPLAY DEVICE AND METHOD OF FABRICATING THE SAME

BACKGROUND OF THE INVENTION

1. Field of the Invention

The present invention disclosed in the present specification relates to a liquid crystal display using thin film transistors and, more particularly, to a liquid crystal display in which pixel switching circuits and peripheral driver circuits are integrally formed on the same substrate.

2. Description of the Prior Art

In recent years, techniques for fabricating semiconductor devices such as thin film transistors (TFTs) consisting of semiconductor thin films formed on cheap glass substrates have developed rapidly, because there is an increasing demand for active matrix type liquid crystal displays.

An active matrix type liquid crystal display has several tens to millions of pixel regions arranged in a matrix-like form and at least one TFT is disposed at each pixel. Electric charge going into and out of each pixel electrode is controlled by the switching function of each TFT.

The fundamental structure of the active matrix type liquid crystal display having TFT arrays is now described by referring to FIG. 1. Firstly, FIG. 1(A) is a cross-sectional view taken perpendicular to the substrates of the liquid crystal display. This cross section is equal to the cross sectional view along the broken line A–A' of FIG. 1(B).

A substrate 101 is transparent to light, and an insulating film (not shown) is deposited on the surface of the substrate. Reference numerals show an active layer 102, a gate electrode 103, a data line 104, a drain electrode 105, an interlayer insulating film 106, a black matrix 107, pixel electrodes 108 comprising a transparent conducting film, and an orientation film 109.

The whole substrate having the constitution described above and having such TFT arrays thereon is hereinafter referred to as the active matrix substrate. In FIG. 1(A), only one pixel is shown, however, in practice, the active matrix substrate is constituted by pixel regions containing several tens to millions of pixel switching TFTs (referred to as pixel TFTs) and by peripheral driver circuit regions including a plurality of TFTs for driving the pixel TFTs.

On the other hand, reference numeral 110 shows a substrate having transparency, 111 shows a counter electrode consisting of a transparent conducting film, and 112 shows an orientation film. The whole of this substrate opposite to the active matrix substrate is referred to as a counter substrate.

As shown in FIG. 2(A), the active matrix substrate 203 and the counter substrate 204 are performed by orientation treatment to orient the molecules of the liquid crystal material in a given direction. Then, granular spacers 201 are uniformly dispersed on the active matrix substrate 203 to control the cell gap, or cell spacing, between the active matrix substrates 203 and the counter substrate 204. Thereafter, a sealing material 202 is printed. The sealing material 202 acts as an adhesive to mate the substrates each other and also as a sealant to prevent the liquid crystal material injected into the cell between the substrates from leaking from the substrate. Also, reference numeral 205 shows a driver circuit regions and 206 shows a pixel electrode. The direction of rubbing is indicated by 207.

FIG. 3 is a cross-sectional view of an active matrix substrate. As shown in FIG. 3, since granular spacers 301 are uniformly dispersed on the whole active matrix substrate 302 to control the cell gap, the spacers 301 exist in a peripheral driver circuit region 304, as well as in a pixel region 303. Usually, a pixel TFT 305 does not greatly differ in size from a driver circuit TFT 306. However, a black matrix covering the pixel TFTs 305 and pixel electrodes consisting a transparent conducting film are formed in the pixel region 303. Also, if the liquid crystal display is of the reflection type, reflective electrodes are formed in the pixel region 303. Furthermore, connecting wirings are formed in the driver circuit region 304 to constitute a CMOS circuit driving the pixel TFTs 305. Hence, the pixel region 303 differs in height above the surface of the substrate from the driver circuit region 304.

It is assumed that the pixel region is at a greater height above the substrate surface than the driver circuit region. The spacers are present in the driver circuit region, as well as in the pixel region. If granular spacers of almost uniform size are positioned in these two kinds of regions, the height above the substrate surface differs according to the spacer position. When, $h_p$ and $h_d$ are directed to the height of the top surface of each spacer located in the pixel region and in the driver circuit region, respectively, it can be seen that a difference in size between the pixel and driver circuit regions gives rise to a height difference $h=h_p$ ; $h_d$.

Then, as shown in FIG. 4(A), the active matrix substrate 401 is mated with the counter substrate 402. Subsequently, a liquid crystal material 406 is injected between the active matrix substrate and the counter substrate, thereby, the entrance hole 403 is sealed with a sealant material (FIG. 4(B)). In this way, an active matrix type liquid crystal display having such a structure as shown in FIG. 1(A) is manufactured.

However, the liquid crystal display having such a structure as described above suffers from the following disadvantages.

Because of the height difference h due to the difference in size between the pixel region 404 and the driver circuit region 405, when the active matrix substrate 401 is mated with the counter substrate 402, it is impossible to make the cell gap uniform. This results in cell thickness nonuniformities. In addition, as shown in FIGS. 4(A) and 4(B), the counter substrate 402 is distorted. Because of these cell thickness nonuniformities and distortion of the counter substrate 402 in the liquid crystal display device, various defects are developed as follows; the image displayed on the liquid crystal display becomes nonuniform and also, interference patterns appear on the top surface of the counter substrate 402.

Where the driver circuit region is at a greater height than the pixel region above the substrate surface, extra force is applied to the spacers dispersed on the driver circuit region due to the height difference h when the active matrix substrate is mated with the counter substrate. Consequently, the driver circuit TFTs that are more complex in structure than the pixel TFTs are damaged not a less. As a result, the manufacturing yield is adversely affected.

Where granular spacers 115 are present on the pixel region as shown in FIG. 1(B), the orientation of the molecules of the liquid crystal material is disturbed near the spacers 115 and so disturbance of the displayed image (disclination) 116 may be observed.

Because of the height difference h described above, when the active matrix substrate is mated with the counter substrate, excess force is applied to the spacers dispersed on the driver circuit TFTs. Thus, the driver circuit TFTs that are more complex in structure than the pixel TFTs are damaged not a less. Consequently, the manufacturing yield is deleteriously affected.

Where the cell gap is controlled using the conventional granular spacers as mentioned above, a good display may not be provided due to various factors.

Also, where a liquid crystal display is manufactured as a commercial product or as a prototype, the cell gap would be generally set to about 5 to 6 μm, regardless of the pixel pitch 117. In the future, liquid crystal panels with high definition will be required, and so the pixel pitch 117 will tend to be further fine.

For example, a projection type Liquid Crystal Display (projection) must have small panel size. Moreover, it must be designed to display an image with the high definition as possible because the image is projected onto a screen. Accordingly, in the future it will be necessary to manufacture LCDs with pixel pitches not higher than 40 μm, preferably 30 μm or less.

In this case, if the cell gap is kept at 5 to 6 μm, it is considered that disclinations are produced possibly under the influence of a lateral electric field. Therefore, as the pixel pitch decreases, it is necessary to reduce the cell gap.

In the liquid crystal display that needs to produce an image with such high definition, even granular spacers of several micrometers lead to a deterioration of the display quality when they are present in the effective display region.

Also, liquid crystal displays using ferroelectric liquid crystals, which have attracted the attention recently, and reflection liquid crystal displays are required to have smaller cell gaps because of their characteristics.

However, it is generally difficult to manufacture a cell with a small and uniform cell gap by the use of conventional granular spacers.

In the conventional liquid crystal display in which pixel TFTs and driver circuit TFTs are integrally formed on the same substrate, a liquid crystal material and an insulating film exist also in the driver circuit regions because of the nature of the structure. The liquid crystal material and insulating film existing on the driver circuit regions produce unnecessary load capacitances on signal lines for driver circuit TFTs. In this case, these load capacitances attenuate signals flowing through the driver circuits. Hence, it is impossible to transmit signals faithfully to the pixel TFTs. Furthermore, load capacitances are produced between signal lines due to the liquid crystal material and insulating layer present between the signal lines adjacent or close to each other. As a result, a crosstalk is induced.

It is an object of the present invention to provide a semiconductor display device that is free from cell thickness nonuniformities and capable of displaying images with good quality by producing a cell having a small and uniform cell gap, which has been difficult by using conventional granular spacers. Also, in the case of using conventional granular spacers, it is another object of the invention to prevent unnecessary stress in the peripheral driver circuit TFTs when two substrates are mated together, and protect the driver circuit TFTs against damage. Further, it is an object of the invention to provide a semiconductor display in which load capacitances on driver circuits are minimized and which is capable of providing a good display without crosstalk.

SUMMARY OF THE INVENTION

A liquid crystal display according to the present invention at least comprising: a first substrate including a pixel region at least having a plurality of TFTs (thin film transistors) and a plurality of pixel electrodes electrically connected with the TFTs, and driver circuit regions which at least have driver circuits constituted by a plurality of TFTs for driving the a plurality of TFTs and which are provided in a place different from the pixel region; a second substrate opposite to the first substrate; a liquid crystal material held between the first and second substrates; a gap retaining material for controlling a gap between the first and second substrates; and a sealant; wherein the gap retaining material exists in regions outside of the pixel region and of the driver circuit regions. By this the above object is achieved.

The pixel region may be surrounded by the gap retaining material.

The driver circuit regions may be surrounded by the gap retaining material.

The gap retaining material may consist of any one of polyimide, acrylic, polyamide, and polyimidamide.

The gap retaining material may consist of a UV-curable resin or epoxy resin.

In a liquid crystal display according to the present invention at least comprising: a first substrate including a pixel region at least having a plurality of pixel electrodes and a plurality of TFTs electrically connected with the pixel electrodes, and driver circuit regions which at least have driver circuits constituted by a plurality of TFTs for driving the TFTs and which are provided in a place different from the pixel region; a second substrate opposite to said first substrate; a liquid crystal material held between the first and second substrates; a gap retaining material for controlling a gap between the first and second substrates; and a sealant; wherein the gap retaining material is a continuous wall surrounding the pixel region, and top surfaces of source lines for a plurality of TFTs constituting the driver circuit contact a substance having a smaller dielectric constant than top surfaces of the source lines of TFTs constituting the pixel region. By this the above object is achieved.

The pixel region may be surrounded by the gap retaining material.

The driver circuit regions may be surrounded by the gap retaining material.

Top surfaces of gate lines for a plurality of TFTs constituting the driver circuit may contact a substance having a smaller dielectric constant than top surfaces of the source lines and the gate lines of a plurality of TFTs constituting the pixel region.

The material having a smaller dielectric constant may be air.

The material having a smaller dielectric constant may be an inert gas.

The gap retaining material may consist of any one of polyimide, acrylic, polyamide, and polyimidamide.

The gap retaining material may consist of a UV-curable resin or epoxy resin.

The pixel electrodes and the TFTs electrically connected with the pixel electrodes may be arranged in a matrix-like form.

In a method of fabricating a liquid crystal display according to the present invention at least comprising the steps of: forming a first substrate including a pixel region at least having a plurality of TFTs and a plurality of pixel electrodes electrically connected with the TFTs, and driver circuit regions which at least have driver circuits constituted by a plurality of TFTs for driving the TFTs and which are provided in a place different from the pixel region; forming a second substrate opposite to the first substrate; forming a gap retaining material for controlling a gap between the first substrate and second substrates; exposing top surfaces of source lines of a plurality of TFTs constituting the driver circuits; bonding together the first and second substrates; and injecting a liquid crystal material between the first and second substrates; wherein the gap retaining material exists in regions outside of the pixel region and of the driver circuit regions. By this the above object is achieved.

This method of fabricating a liquid crystal display in accordance with the invention may further comprise the step of surrounding the driver circuit regions by the gap retaining material.

This method of fabricating a liquid crystal display in accordance with the invention may further comprise the step of exposing top surfaces of the gate lines of a plurality of TFTs constituting the driver circuits.

In a liquid crystal display according to the present invention at least comprising: a substrate including a pixel region at least having a plurality of TFTs and a plurality of pixel electrodes electrically connected with the TFTs, and driver circuit regions which at least have a plurality of driver circuits for driving the TFTs and which are provided in a place different from the pixel region; a gap retaining material formed on said substrate; and a liquid crystal layer in which a liquid crystal material is dispersed into a polymer material; wherein the gap retaining material exists in regions outside of the pixel region and of the driver circuit regions. By this the above object is achieved.

In the present invention, the cell gap is controlled by the gap retaining material extending continuously and surrounding the pixel region so that a small cell thickness that is uniform over whole of the transistor display device can be obtained.

Also, in the present invention, when the active matrix substrate is mated with the counter substrate, stress is produced neither in the pixel TFTs nor in the driver circuit TFTs. Consequently, neither the pixel TFTs nor the driver circuit TFTs are damaged.

Further, according to the invention, since no liquid crystal material is present in the driver circuit regions and, in addition, unnecessary insulating layer or the like have been removed, load capacitances on the driver circuits becomes small, so that the generation of crosstalk can be suppressed.

According to the present invention, since the cell gap is controlled by the continuously extending gap retaining material which surrounds the pixel region, it is possible to obtain a small and uniform cell thickness over whole of a semiconductor display device. Furthermore, according to the invention, when the active matrix substrate is mated with the counter substrate, stress is produced neither in the pixel TFT nor in the driver circuit TFT. Consequently, neither the pixel TFT nor the driver circuit TFT is damaged so that the production yield is enhanced. In addition, according to the invention, no liquid crystal material is present in the driver circuit region and, moreover, unnecessary insulating layer, etc. which would normally cover the driver circuit TFT is removed. This reduces the load capacitance on the driver circuit, and so the crosstalk can be suppressed.

BRIEF DESCRIPTION OF THE DRAWINGS

FIG. 13 is a top plan view of a liquid crystal display in accordance with the

DETAILED DESCRIPTION OF THE PREFERRED EMBODIMENTS

In the present invention, a semiconductor display device is fabricated by forming pixel switching TFTs and driver circuit TFTs integrally on the same substrate.

EXAMPLE 1

Figure 1A:
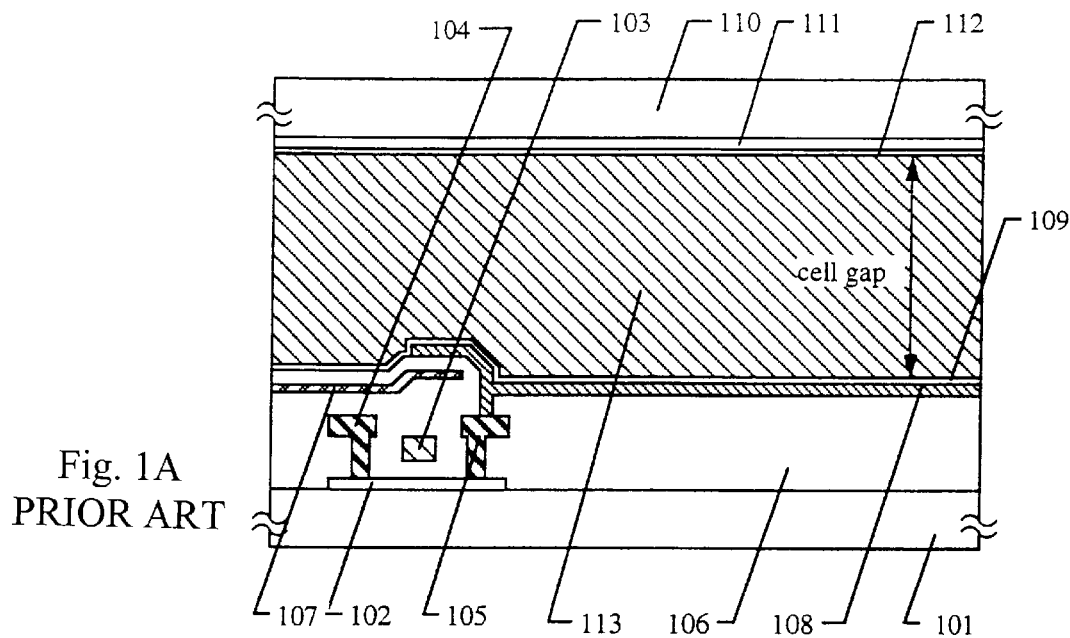
FIGS. 1A–1B are a cross section and a plan view of a conventional liquid crystal display.
Figure 1B:
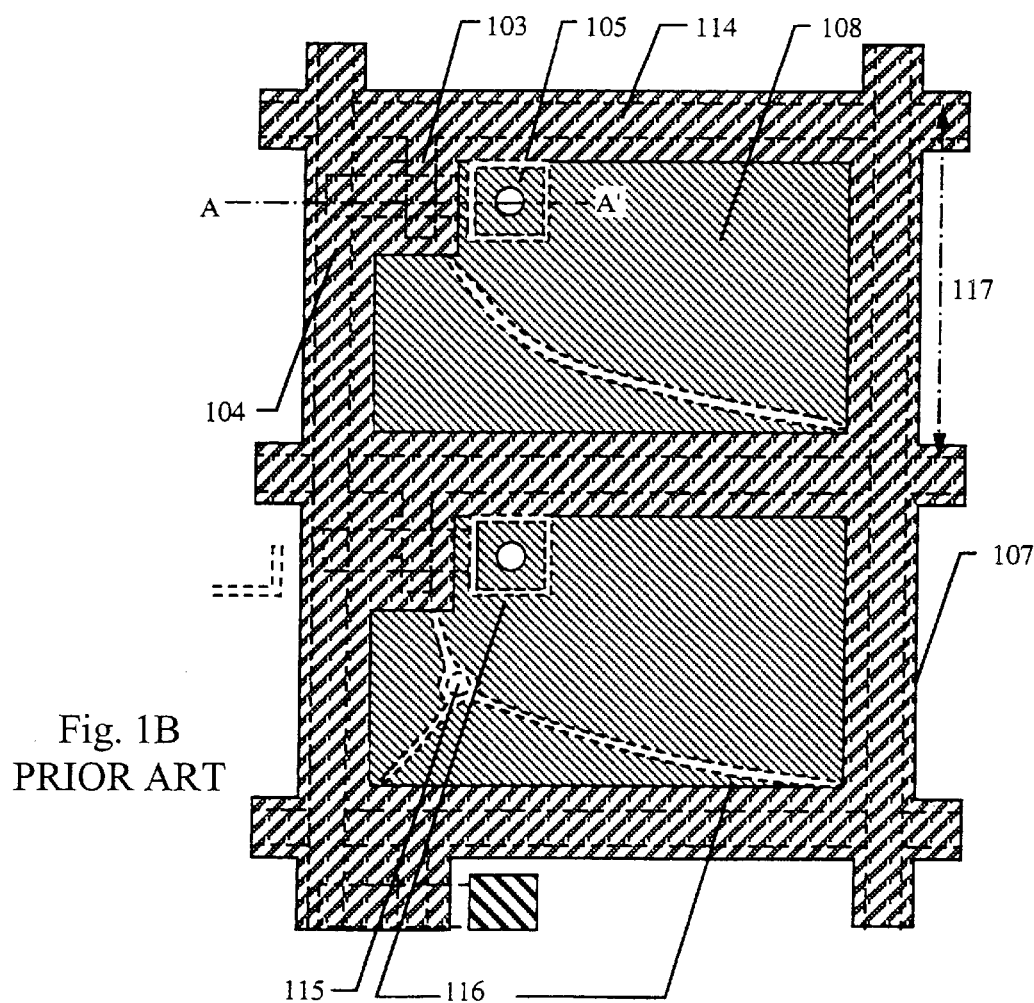
Figure 2A:
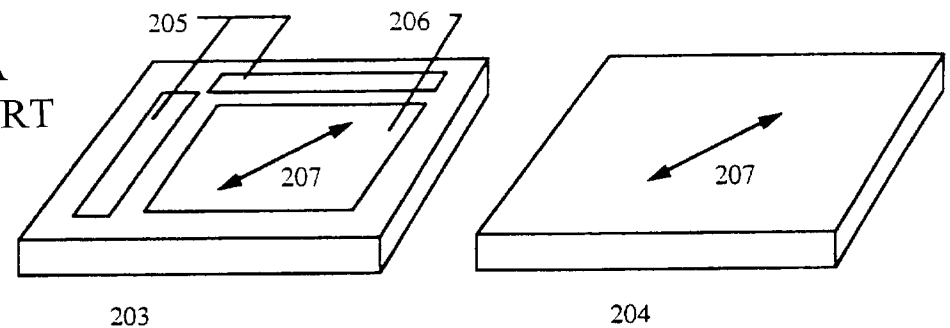
FIGS. 2A–2B show process steps for fabricating the conventional liquid crystal display.
Figure 2B:
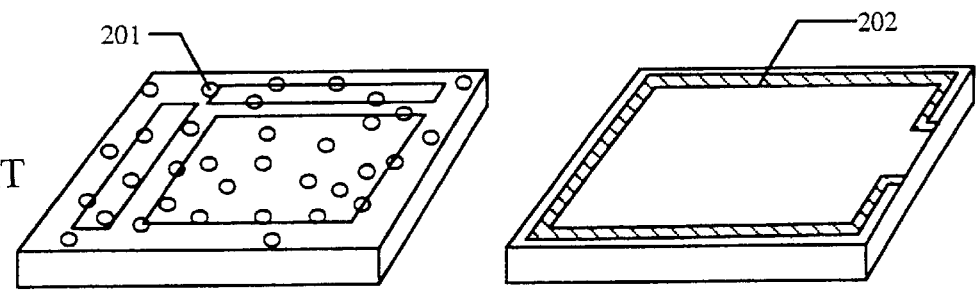
Figure 3:
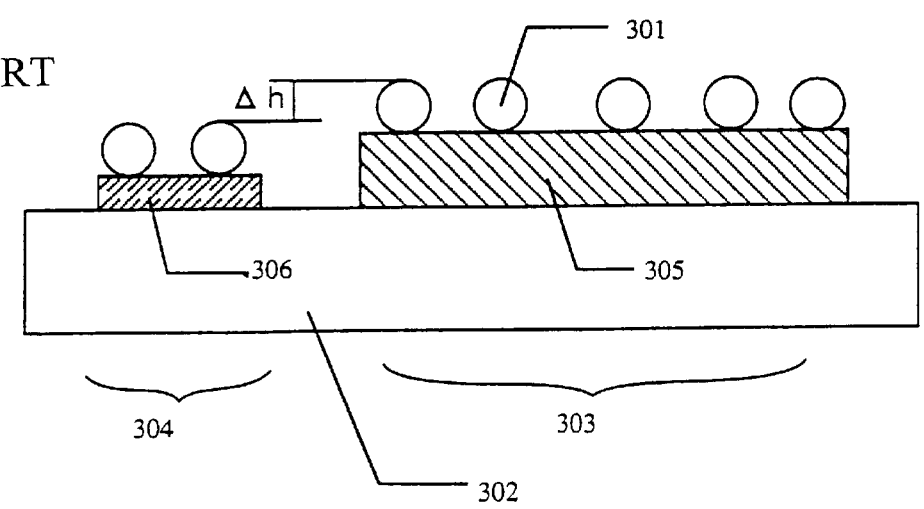
FIG. 3 is a cross section of a conventional liquid crystal display.
Figure 4A:
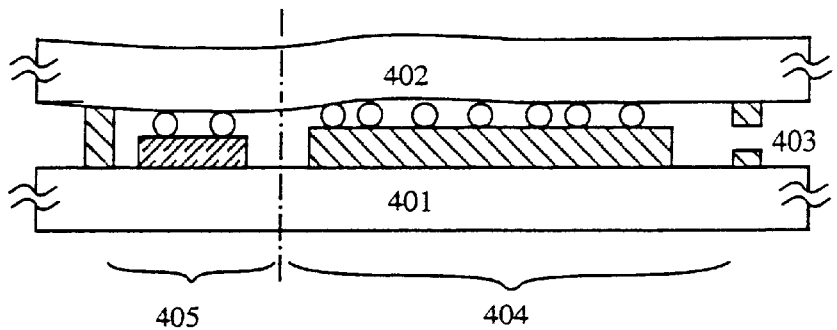
FIGS. 4A–4B are cross-sectional views of a conventional liquid crystal display.
Figure 4B:
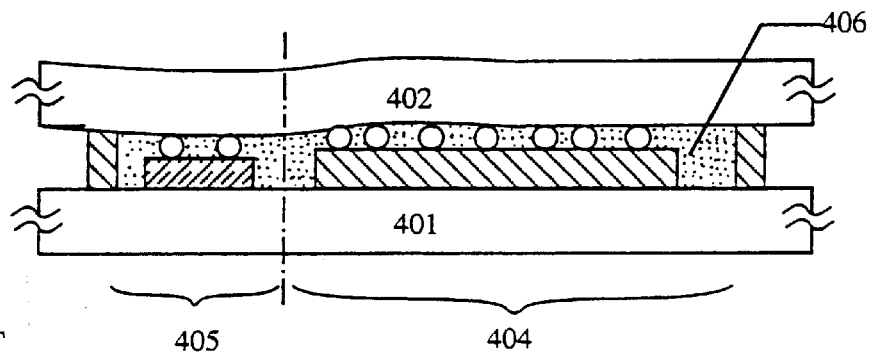
Figure 5A:
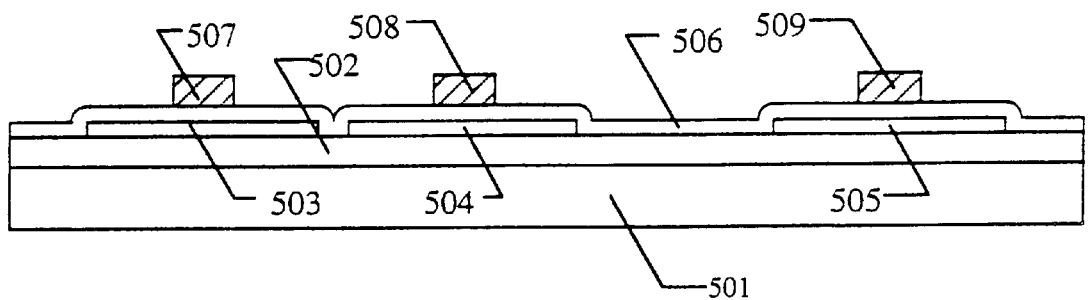
FIGS. 5A–5C, 6A–6C and 7A–7C are cross-sectional views illustrating a process steps for fabricating a liquid crystal display in accordance with the present invention.

A method of fabricating a semiconductor display device according to the present invention is explained as follows. First, fabrication of an active matrix substrate will be explained as illustrated in FIGS. 5. The left-hand portions of FIGS. 5 illustrate a process sequence for fabricating driver circuit TFTs, while the right-hand portions illustrate a process sequence for fabricating pixel TFTs.

Firstly, as shown in FIGS. 5, a silicon oxide film 502 is deposited as an underlying oxide film on a substrate 501 of quartz or glass to a thickness of 100 to 300 nm. This silicon oxide film 502 may be deposited in an oxygen atmosphere by sputtering process or plasma CVD process.

Then, an amorphous or polycrystalline silicon film is formed to a thickness of 30 to 150 nm, preferably 50 to 100 nm, by plasma CVD process or LPCVD process. Subsequently, the silicon film is crystallized by thermal annealing. The thermal annealing is carried out at a temperature of 500° C. or higher, preferably 800–900° C. After the crystallization of silicon film by thermal annealing, the crystallization may be further enhanced by light annealing. Furthermore, when the silicon film is crystallized by thermal annealing, the crystallization of the silicon may be accelerated by adding a catalytic element such as nickel as disclosed in Japanese Patent Laid-open Publication No. H6-244104.

Then, an active layer for TFTs forming a peripheral driver circuit in the form of islands (an active layer 503 for a P-channel TFT and an active layer 504 for an N-channel TFT) and an active layer 505 for pixel TFTs are formed. Although only three TFTs are shown in FIG. 5 for convenience, millions of TFTs are fabricated at the same time in practice.

Further, a gate insulating film 506 is formed to a thickness of 50 to 200 nm by sputtering of silicon oxide in an oxygen atmosphere. This process may be performed by plasma CVD process. Where the silicon oxide film is formed by plasma CVD process, it is preferable to use nitrogen monoxide ($N_2O$) or a mixture of oxygen ($O_2$) and monosilane ($SiH_4$) as a source gas.

Thereafter, a polycrystalline silicon film is formed over the whole surface of the substrate to a thickness of 200 nm to 5 $\mu$m, preferably 200 to 600 nm, by LPCVD process. A trace amount of phosphorus may be contained in the polycrystalline silicon film to enhance the electrical conductivity. This polycrystalline silicon film is etched to form gate electrodes 507, 508 and 509.

Figure 5B:
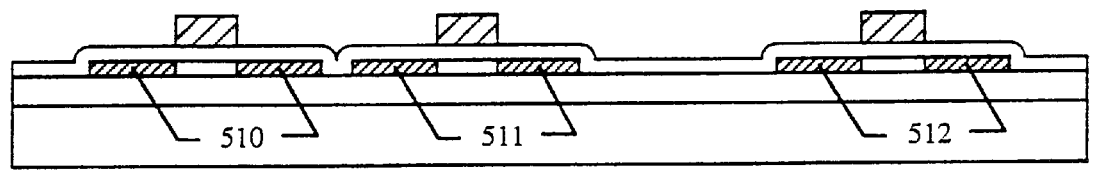

Then, as shown in FIG. 5(B), phosphorus is doped into all the islands of active layer, using the gate electrodes as a mask, in a self-aligned manner by ion doping process. Phosphine ($PH_2$) is used as the doping gas. The dose is $1\times10^{12}$ to $5\times10^{13}$ atoms/cm$^2$. As a result, weak N-type regions (N⁻regions) 510, 511 and 512 are formed.

Figure 5C:
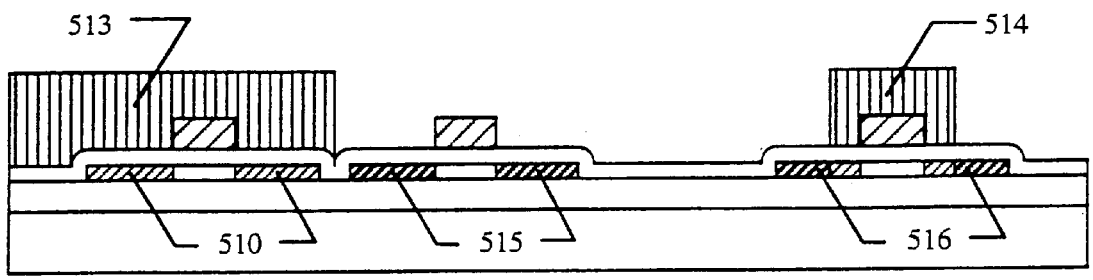

Then, as shown in FIG. 5(C), a mask 513 of photoresist covering the active layer 503 for the P-channel TFT and a mask 514 of photoresist covering the gate electrode 509 of the active layer 505 for the pixel TFTs are formed. This mask of the photoresist covering the gate electrode extends parallel to the gate electrode and covers the electrode up to a position spaced 3 $\mu$m from the end of the gate electrode. Phosphorus atoms are again implanted by ion doping process. Phosphine is used as the dopant gas. The dose is $1\times10^{14}$ to $5\times10^{15}$ atoms/cm$^2$. As a result, source/drain regions 515, 516 of strong N-type regions (N⁺regions) are created. During this implantation step, however, no phosphorus atoms are implanted into a region 517 of the weak N-type region (N⁻region) 512 of the active layer 505 for the pixel TFTs coated with the mask 514. Therefore, the region 517 remains weak N-type region.

Figure 6A:
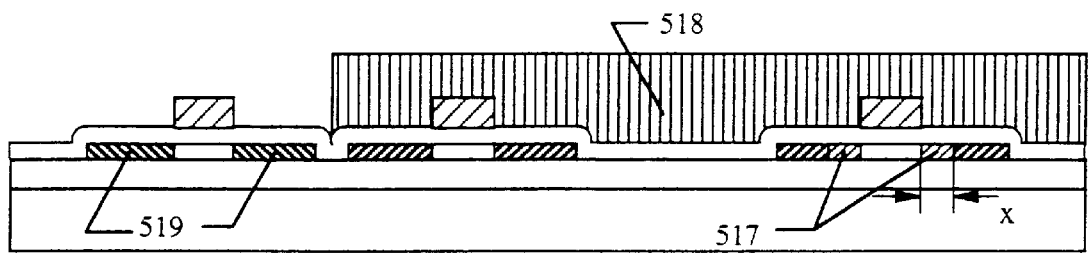

Then, as shown in FIG. 6(A), the active layer of the N-channel TFTs, 504 and 505 is coated with a mask 518 of photoresist. Ion doping is performed, using diborane ($B_2H_6$) as a doping gas, to implant boron ions into islands 503. The dose is $5\times10^{14}$ to $8\times10^{15}$ atoms/cm$^2$. Since the dose of boron atoms in this time is greater than the dose of phosphorus atoms in the previous step shown in FIGS. 7(A)–7(C), the weak N-type region 510 is reversed into a strong P-type region 519.

By the doping described above, strong N-type regions (source/drain regions) 515, 516, strong P-type regions (source/drain regions) 519, and a weak N-type region (low concentration impurity regions) 517 are formed. In the present embodiment, the width x of the low concentration impurity regions 517 is about 3 $\mu$m (FIG. 6(A)).

Thereafter, thermal annealing is done at 450 to 850° C. for 0.5 to 3 hours to activate the doped impurity and to repair the crystallinity of the silicon. That is, this thermal annealing treatment repairs the damage of the silicon film sustained by the doping.

Figure 6B:
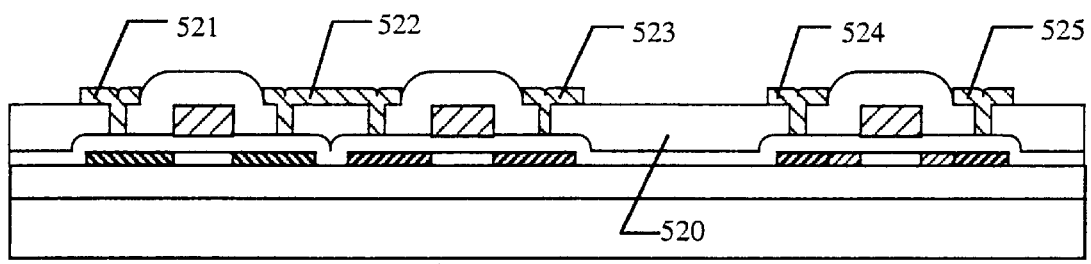

Then, as shown in FIG. 6(B), an interlayer insulating film 520 of silicon oxide is formed over the whole surface by plasma CVD process. The interlayer insulating film has a thickness of 300 to 6000 nm. This interlayer insulating film 520 may consist either of a silicon nitride film or a silicon oxide/silicon nitride multilayer film. Then, the interlayer insulating film 520 is etched by wet etching process to form contact holes in the source/drain regions.

Figure 6C:
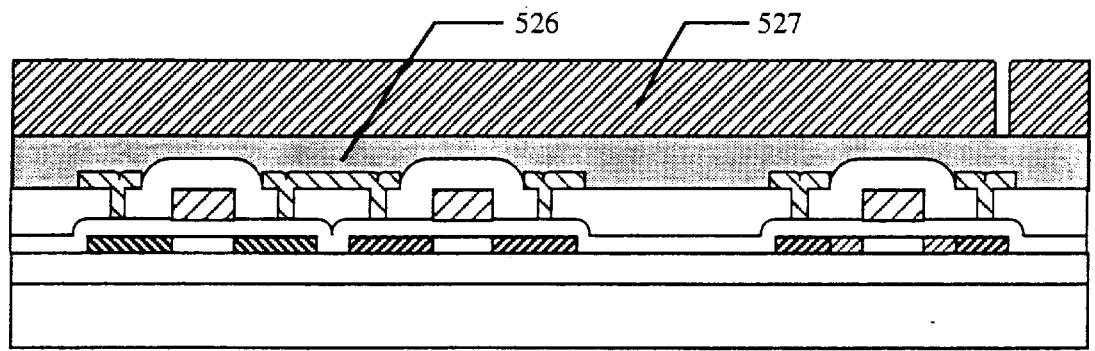
Figure 7A:
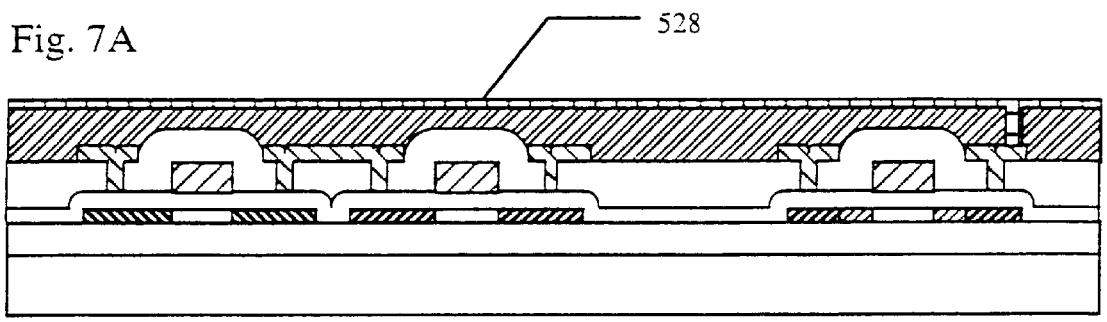
Figure 7B:
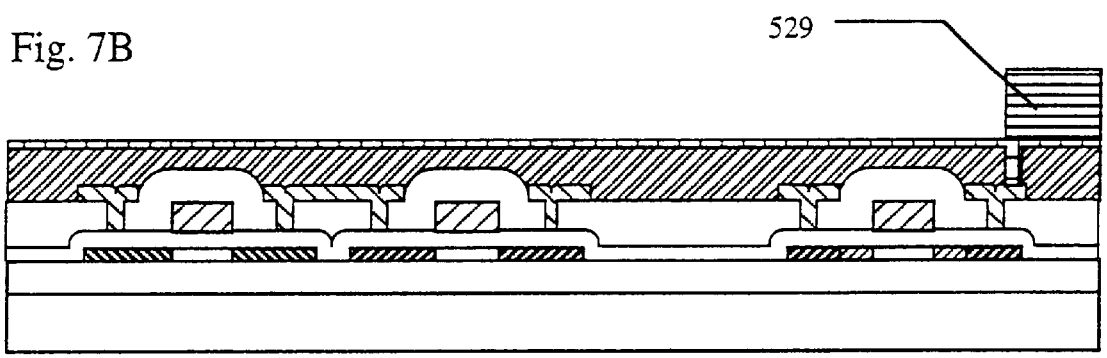

Thereafter, a titanium film having a thickness of 200 to 600 nm is formed by sputtering process. This film is etched to form electrodes/wirings 521, 522, 523 for driver circuits and electrodes/wirings 524, 525 for pixel TFTs. These electrodes/wirings 521, 522, 523 for the driver circuits and electrodes/wirings 524, 525 for the pixel TFTs may also be made of a Ti—Al—Ti multilayer film, for example. Then, as shown in FIG. 6(C), a polyimide film 526 having a thickness of 100 to 300 nm is formed. Photoresist 527 is formed on the polyimide film to form contact holes reaching the electrodes 525 of the pixel TFTs by photolithography process. Subsequently, as shown in FIG. 7(A), an ITO (indium-tin oxide) film 528 is formed to a thickness of 50 to 150 nm by sputtering process. Thereafter, as shown in FIG. 7(B), a mask 529 is formed and etched to form pixel electrodes 530. At least one or more TFT is disposed at each pixel electrode in the pixel region, and these TFTs are electrically connected. Shift registers or address decoders are used as the driver circuits. Also, other circuits may be constructed according to the need.

In this way, a plurality of driver circuit TFTs(driver circuit regions 531) and a plurality of pixel TFTs (pixel regions 532) are integrally formed on the same substrate, thus completing an active matrix substrate. In the present embodiment, there are 1024 (lengthwise)×768 (breadthwise) pixels.

The TFT substrate is well washed to sufficiently wash away various chemicals including the etching solution used for the surface treatment during the TFT fabrication and the resist stripping solution.

Figure 8A:
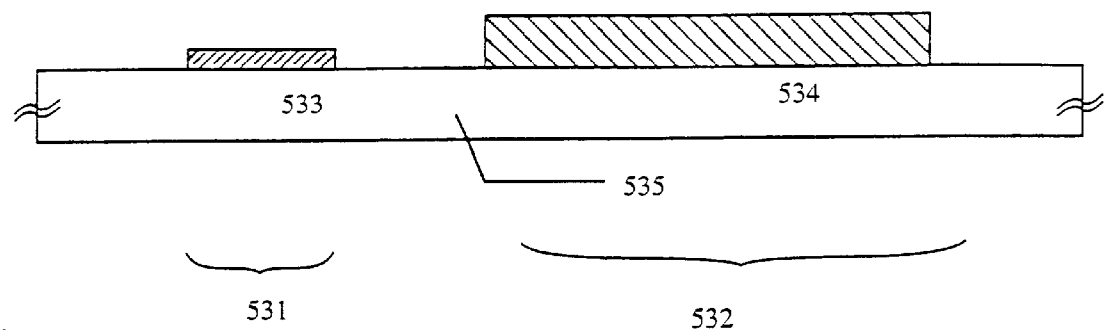
FIGS. 8A–8D are cross-sectional views illustrating steps for forming a gap retaining material in accordance with the invention.

A process sequence for forming the gap retaining material is next described. In the following description, as shown in FIG. 8(A), the driver circuit regions 531 and the pixel region 532 are simplified into a driver circuit TFT 533, a pixel TFT 534, and an active matrix substrate 535.

Figure 8B:
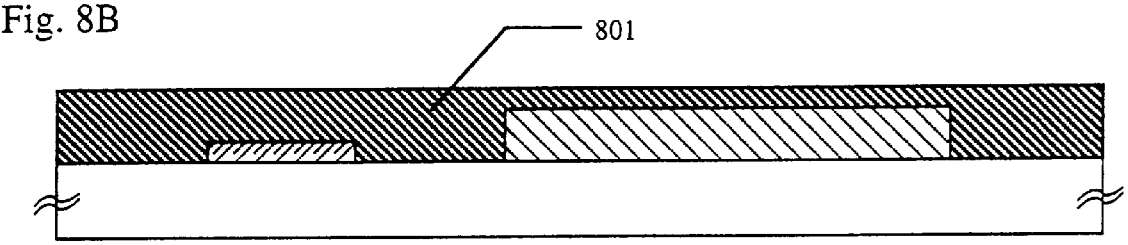

First, as shown in FIG. 8(B), a photosensitive polyimide film 801 is formed to a thickness of 2.2 $\mu$m by spin coating process. Then, the photosensitive polyimide film 801 is allowed to stand at room temperature for 30 minutes in order to make the thickness of the polyimide film 801 uniform over the whole surface of the active matrix substrate. Thereafter, the active matrix substrate having the photosensitive polyimide film 801 formed thereon is prebaked at 120° C. for 3 minutes.

Figure 8C:
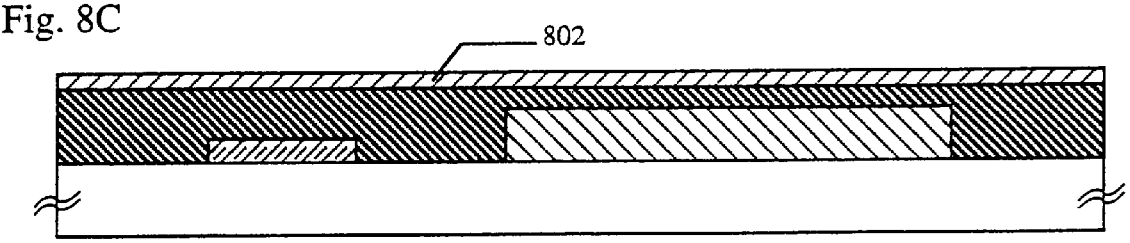
Figure 8D:
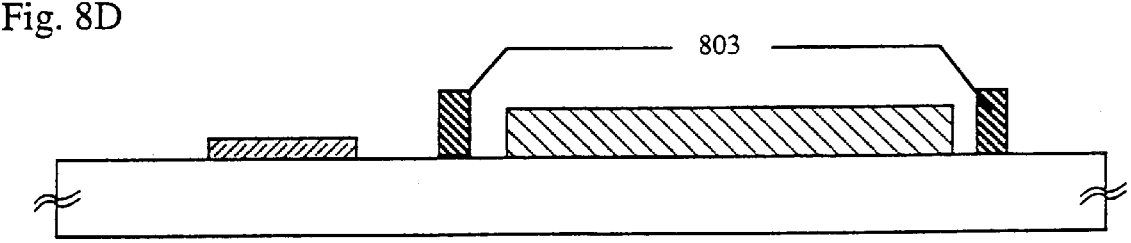

Then, the photosensitive polyimide film 801 is patterned. As shown in FIG. 8(C), the photosensitive polyimide film 801 is coated with a photomask 802, and UV light is applied to the active matrix substrate from above it. Thereafter, a developing treatment is carried out, and a postbaking is performed at 280° C. for 1 hour. In this manner, as shown in FIG. 8(D), a patterned cell gap retaining material 803 is formed.

Figure 9A:
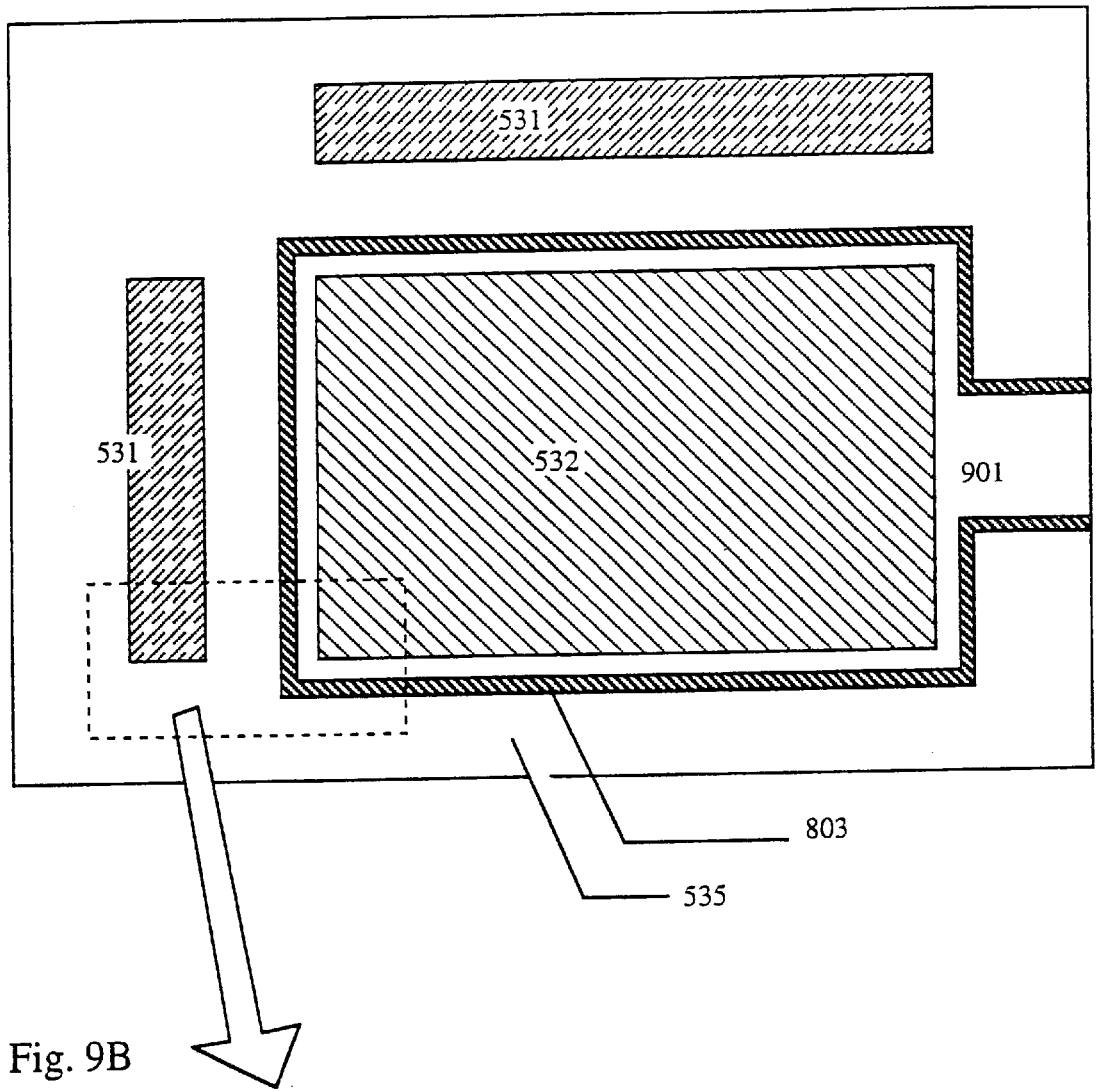
FIGS. 9A–9B are a top plan view and a perspective view of a liquid crystal display in accordance with the invention.

The active matrix substrate 535 is shown in the top plan view of FIG. 9(A). As shown in FIG. 9(A), the gap retaining material 803 has a width of 20 $\mu$m and a height of 2.2 $\mu$m and is spaced 50 $\mu$m from the pixel region 532. The retaining material 803 extends continuously and surrounds the pixel region 532. A liquid crystal injecting hole 901 is provided in a part of the cell gap retaining material 803.

The height accuracy is important for the gap retaining material 803 in accordance with the present invention. In the present embodiment, the height accuracy of the gap retaining material 803 is 0.1 $\mu$m. With respect to the position of the gap retaining material 803, an accuracy in the degree of 10 $\mu$m is sufficient. In the present embodiment, the gap retaining material 803 is formed between the pixel region 532 and the driver circuit region 531. Since the gap between the pixel region 532 and the driver circuit region 531 is sufficiently larger than the width of the gap retaining material 803, the accuracy of the position of the gap retaining material 803 is not very important. However, the gap retaining material 803 is formed neither inside the pixel region 532 nor inside the driver circuit region 531.

Figure 9B:
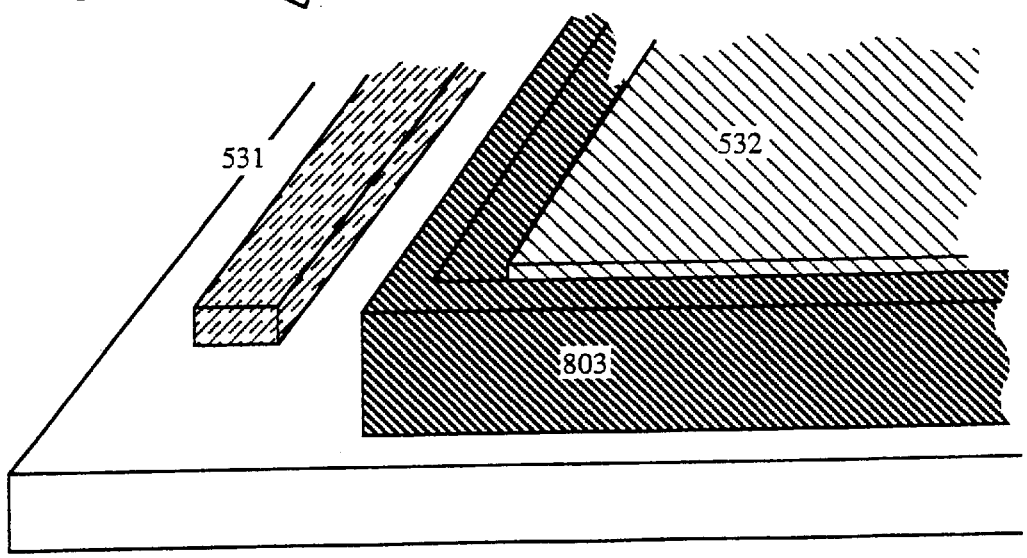
Figure 11:
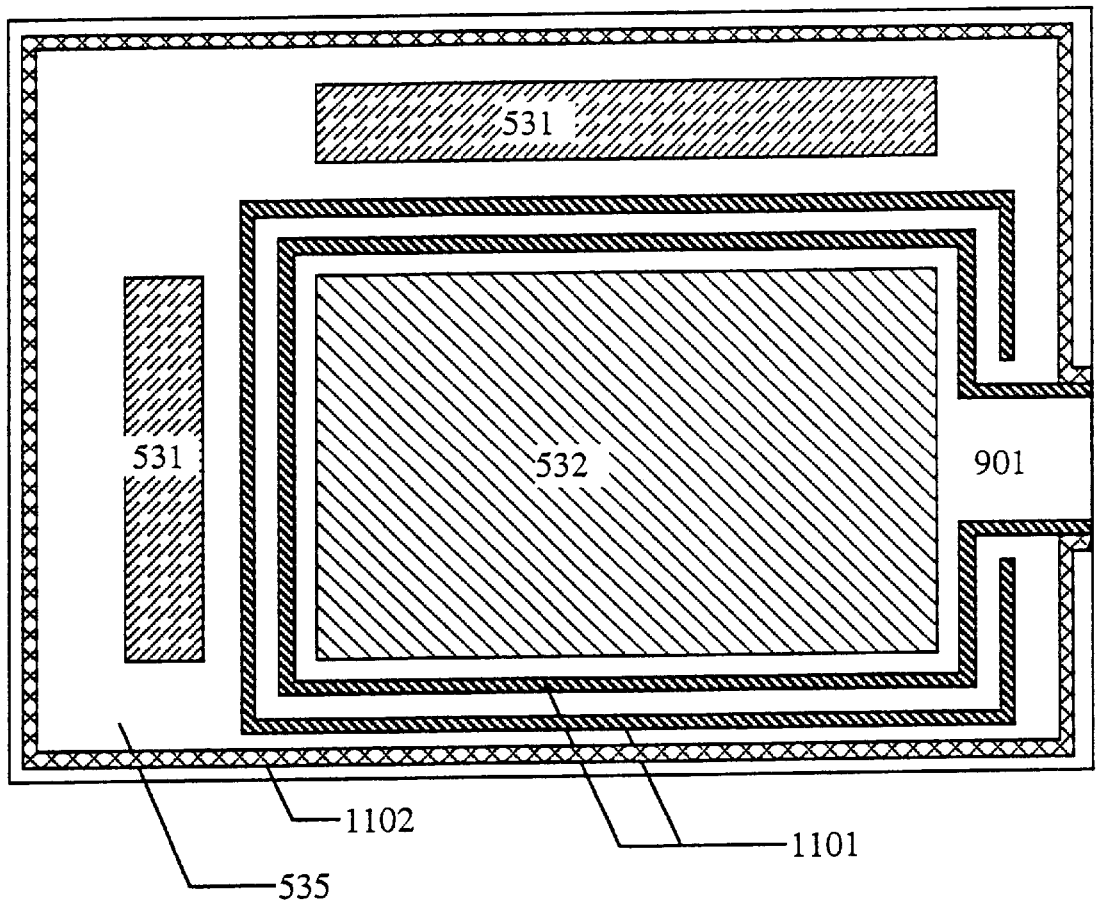
FIG. 11 is a top plan view of a liquid crystal display in accordance with the invention.
Figure 13:
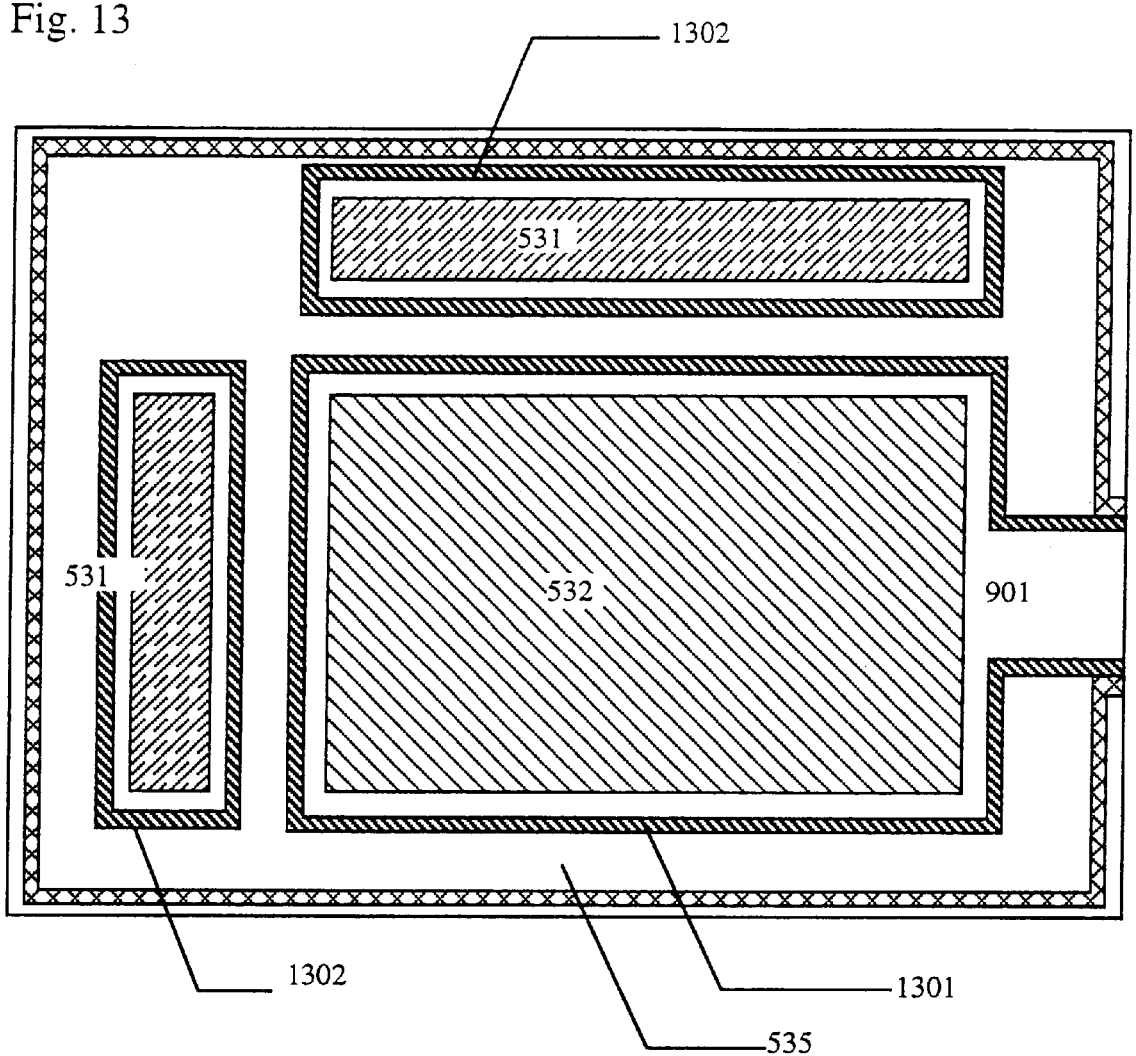

In the present embodiment, as shown in FIGS. 9(A) and 9(B), the gap retaining material 803 is shaped like a continuous wall and extends vertically to the substrate. The side surfaces of the gap retaining material may have a gradient. The gap retaining material may take any shape as long as the cell gap between the active matrix substrate and the counter substrate can be controlled and the liquid crystal material can be confined within the pixel region. Although the cell gap retaining material is formed so as to surround the pixel region 532 at a given interval from the pixel region 532 in the present embodiment, it may be possible to form, as shown in FIG. 11, a plurality of cell gap retaining materials 1101 at different intervals from the pixel region 532. Indicated by 1102 is a sealant. Further, as shown in FIG. 13, a continuous wall of gap retaining materials 1301 and 1302 which surround the pixel region 532 and the driver circuit region 531, respectively may be formed. In the present embodiment, the gap retaining material is made of polyimide. Instead, it may be made of acrylic, polyamide, or polyimidamide.

In the present embodiment, although a plurality of cell gap retaining materials are formed between the pixel region and the driver circuit region, they may be formed at any locations as long as cell gap can be controlled and they are outside of the pixel region and of the driver circuit region.

Then, an orientation film is formed on the active matrix substrate and on the counter substrate. The orientation film is a vertically orientation film made of a polyimide-based material. This polyimide-based vertically orientation film is coated on the active matrix substrate and on the counter substrate by flexo-printing process or screen printing process. In the present embodiment, the orientation film is formed only on the pixel region by flexo-printing process. The orientation film is 100 nm thick. Thereafter, hot air at a temperature of 180° C. is blown against the orientation film to heat (bake) it, thus curing the polyimide.

Next, the surface of the counter substrate on which the orientation film was conducted rubbing treatment in a given direction with a buff cloth having fibers (made of rayon, nylon, or the like) 2 to 3 mm long. Incidentally, in the present embodiment, the active matrix substrate side is not subjected to the rubbing treatment.

Figure 10A:
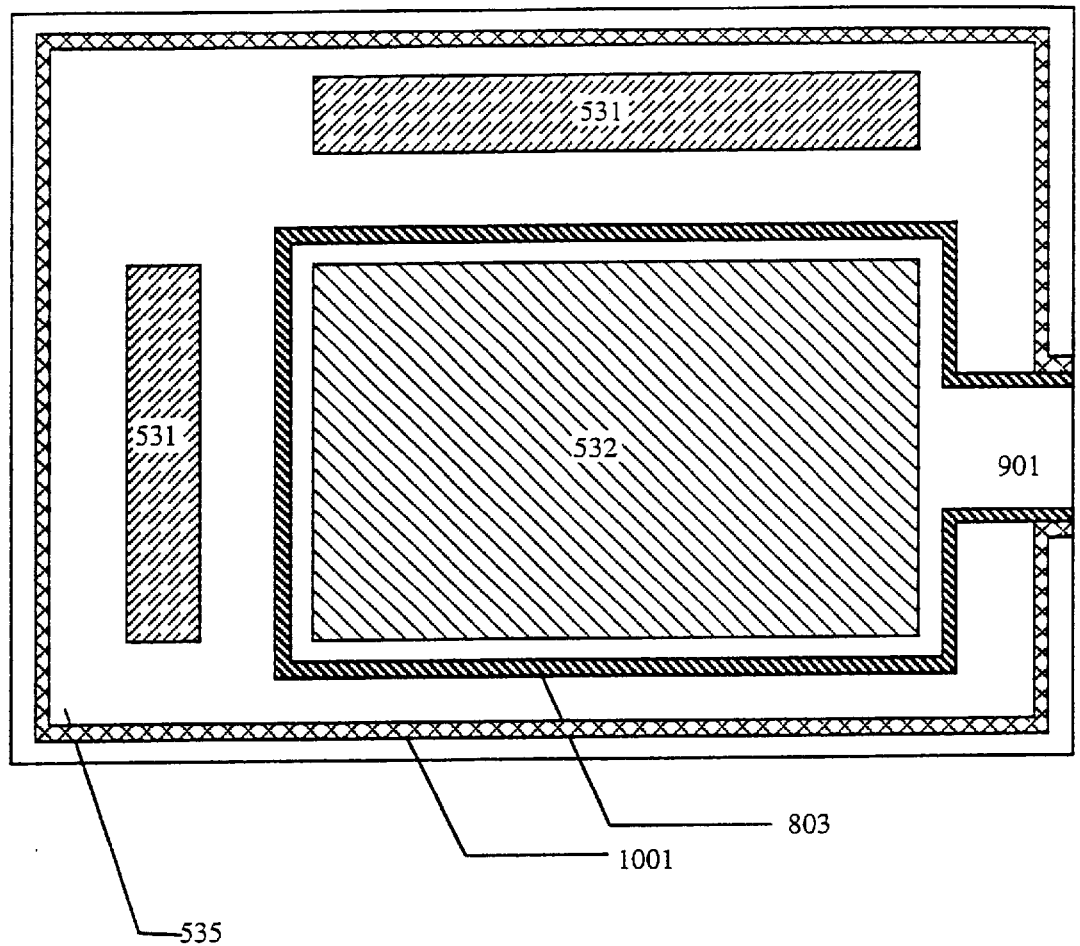
FIG. 10A is a top plan view and 10B is a cross sectional view of a liquid crystal display in accordance with the invention.

Then, as shown in FIG. 10(A), a sealant 1001 is applied to the outer frame of the active matrix substrate 535. The active matrix substrate 535 is mated with the counter substrate 1002 (FIG. 10(B)).

Figure 10B:
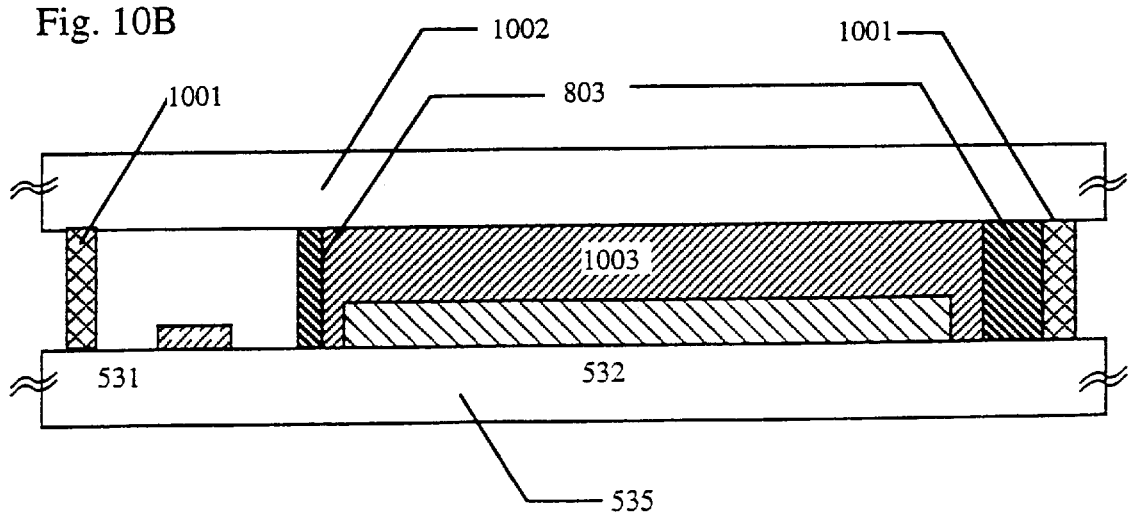

Subsequently, as shown in FIG. 10(B), a liquid crystal material 1003 acting as a display medium is injected from the injecting hole. Thus, the liquid crystal material is held between the active matrix substrate 535 and the counter substrate 1002. Since the continuous gap retaining material surrounds the pixel region 532, the liquid crystal material 1003 is injected only into the pixel region 532. Consequently, no liquid crystal material is present in the driver circuit region 531.

Thereafter, a sealant is applied to the liquid crystal material injecting hole 901 and it is cured by applying UV light thereto, thereby completely sealing the liquid crystal material within the cell.

In this way, a liquid crystal display device filled with the liquid crystal material is completed (FIG. 10(B)).

When the display characteristics were actually examined by using a fabricated cell, no interference patterns were observed at the cell surface. Also, the displayed image was free of disclinations and hence was of good quality.

EXAMPLE 2

Figure 7C:
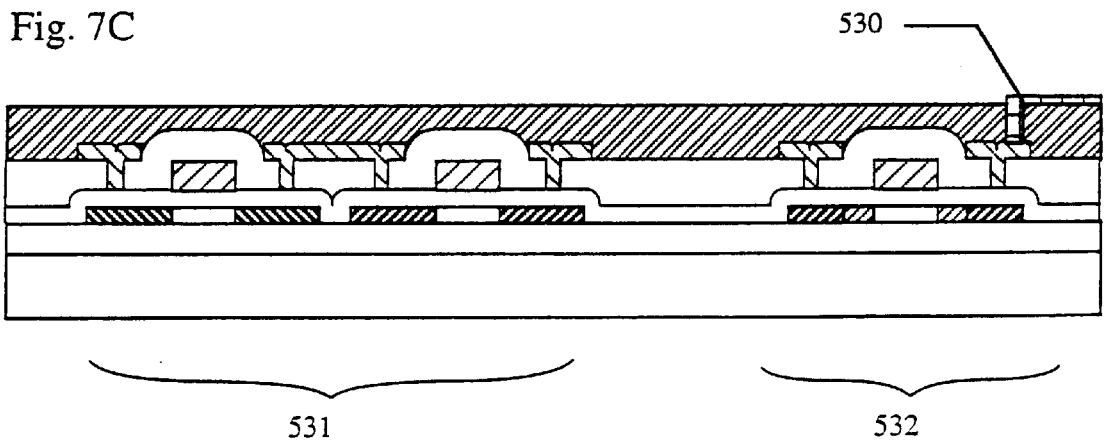

The present Embodiment is identical in process steps with the Embodiment 1 up to the step (FIG. 7(C)) of forming integrally a plurality of driver circuit TFTs (driver circuit region 531) and a plurality of pixel TFTs (pixel region 532) on the same substrate and, therefore, description of precedent steps is omitted.

Figure 12A:
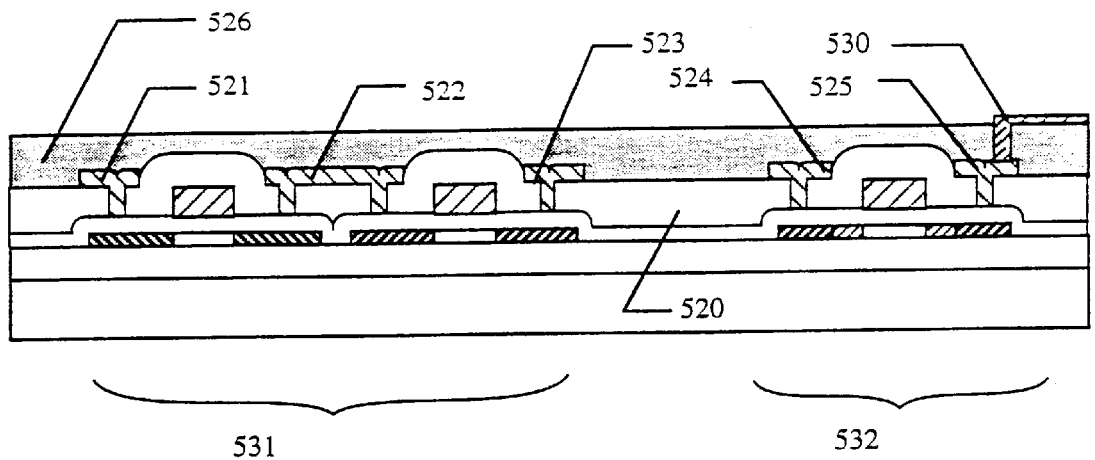
FIGS. 12A–12C, 14A–14C and 15A–15C are cross sectional views illustrating a process steps for fabricating the display in accordance with the invention.

An active matrix substrate on which the pixel TFTs and the driver circuit TFTs have been formed is shown in the cross section of FIG. 12(A).

Figure 12B:
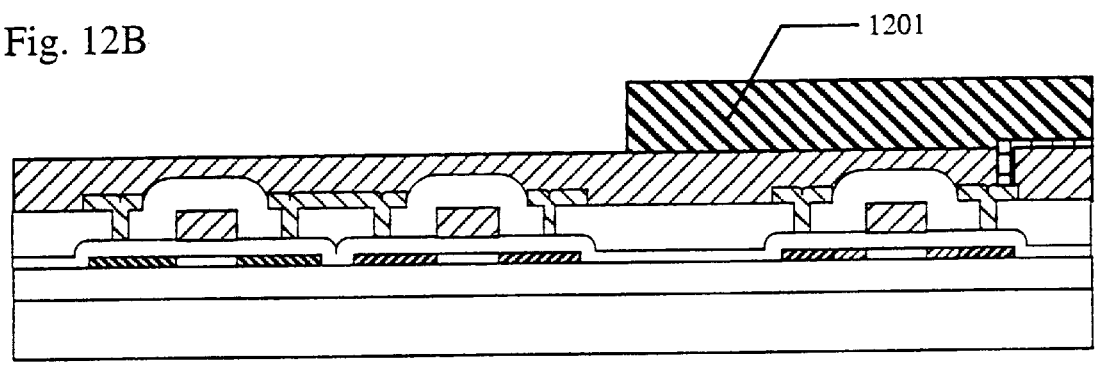
Figure 12C:
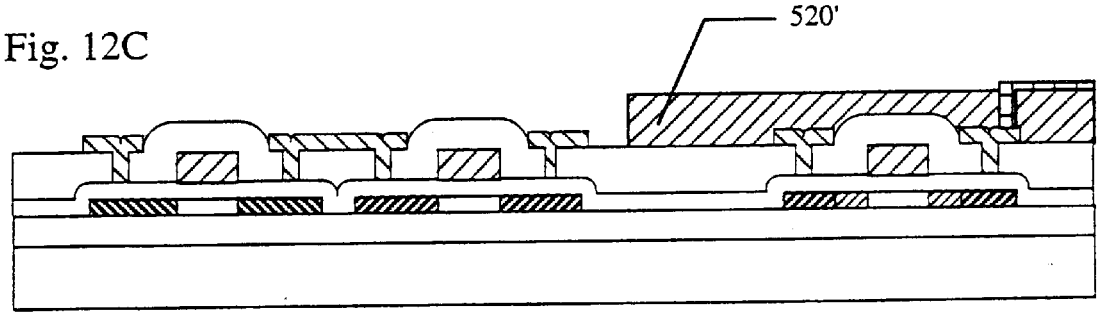

Then, as shown in FIG. 12(B), photoresist 1201 is formed only on the pixel region. Subsequently, oxygen plasma is applied to remove the polyimide film 526 from the driver circuit region. The polyimide film left only in the pixel region is indicated by 520' (FIG. 12(C)). Therefore, the source/drain electrodes 521, 522, and 523 of the driver circuit TFTs are not coated with the polyimide film, and they are exposed to air.

Thereafter, the gap retaining materials are formed. The method of forming the gap retaining materials is omitted here since it is the same as in the Embodiment 1. In the present Embodiment 2, as shown in FIG. 13, the retaining material 1301 surrounding the pixel region and the gap retaining material 1302 surrounding the driver circuit region are formed.

Then, an orientation film is applied by printing process on the active matrix substrate 535 and on the counter substrate to be mated with the active matrix substrate. However, on the active matrix substrate 535, the orientation film forms only on the top of the pixel region 532 and it does not form on the top of the driver circuit region 531. Therefore, the source lines for the driver circuit region 531 still remain exposed to air.

Thereafter, the surface of the counter substrate on which the orientation film has been formed is rubbed in a given direction with a buff cloth having fibers (made of rayon, nylon, or the like) 2 to 3 mm long. Incidentally, in the present Embodiment, the active matrix side is not subjected to the rubbing treatment.

Then, a sealant is applied to the outer frame of the active matrix substrate. The active matrix substrate is mated with the counter substrate.

Subsequently, a liquid crystal material acting as a display medium is injected from the injecting hole 901. Thus, the liquid crystal material is held between the active matrix substrate and the counter substrate. By the continuous gap retaining material formed so as to surround the pixel region, it follows that the liquid crystal material is injected only into the pixel region. Consequently, no liquid crystal material is present in the driver circuit region.

Thereafter, a sealant is applied to the liquid crystal material injecting hole and is cured by applying thereto UV light. Thus, the liquid crystal material is completely sealed within the cell.

The liquid crystal display according to the present Embodiment yields the following advantages in addition to the advantages derived from the liquid crystal display according to the Embodiment 1.

In the liquid crystal display according to the present Embodiment, the upper portion of the driver circuit region is not coated with the polyimide film and so the source/drain lines are exposed to air. Therefore, the load capacitance on the source line is decreased. In consequence, the crosstalk produced between the source/drain lines can be reduced greatly. Hence, the display characteristics can be improved.

When the display characteristics were actually examined by using a fabricated cell, no interference patterns were observed at the cell surface. Also, no crosstalk was generated, the displayed image was free of disclinations and hence was of good quality.

Although in the present Embodiment the top of the driver circuit region is exposed to air, it may be possible to prevent the driver circuit TFTs from deteriorating by filling an inert gas such as nitrogen.

EXAMPLE 3

The present Embodiment is identical in process steps with the Embodiment 1 up to the step (FIG. 6(B)) of forming a semiconductor region on a substrate and, therefore, description of precedent steps is omitted.

Figure 14A:
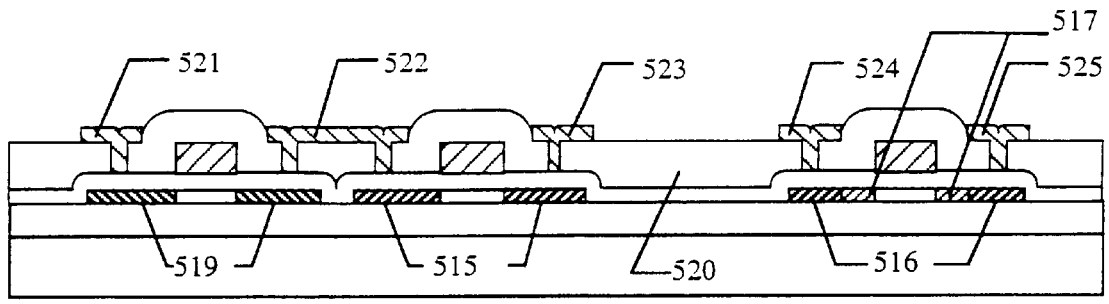

FIG. 14 is referred, as shown in FIG. 14(A), strong N-type regions (source/drain regions) 515, 516, strong P-type regions (source/drain regions) 519, and a weak N-type region (low concentration impurity regions) 517 are formed on the substrate. Further, electrodes/wirings 521, 522, and 523 for the driver circuit and electrodes/wirings 524, 525 for the pixel TFTs are formed. In the present Embodiment, the interlayer insulating film 520 is made of polyimide.

Figure 14B:
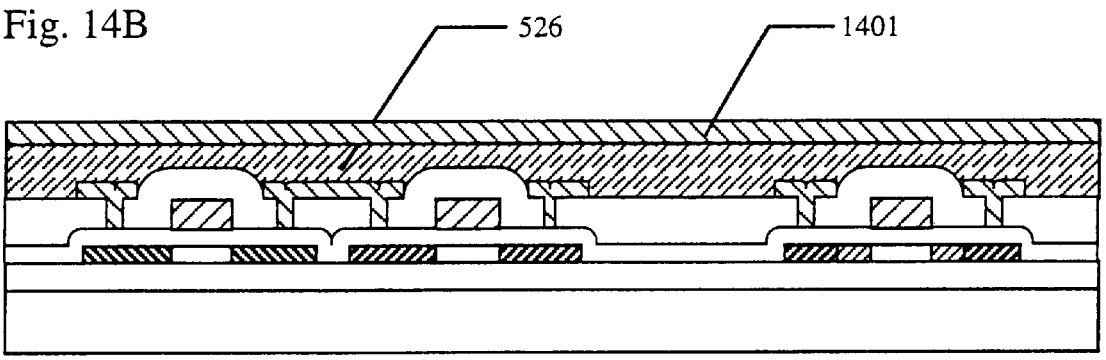

Then, as shown in FIG. 14(B), an interlayer insulating film 526 of polyimide is formed to a thickness of 300 to 600 nm over the whole surface by plasma CVD process. This interlayer insulating film 526 may be made of other organic or inorganic material that provides electrical insulation.

Figure 14C:
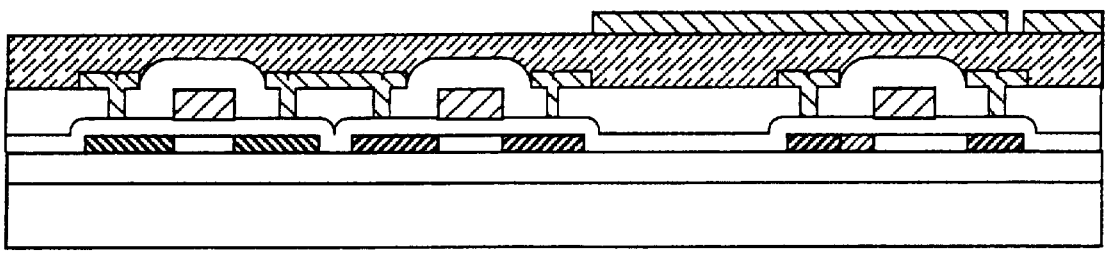

Thereafter, as shown in FIG. 14(B), a titanium film 1401 is formed to a thickness of 200 to 600 nm by sputtering process. This titanium film 1401 is patterned as shown in FIG. 14(C) by etching. As a result, the Ti film covers only the whole surface of each driver circuit TFT and only the contact holes in the pixel TFTs.

Figure 15A:
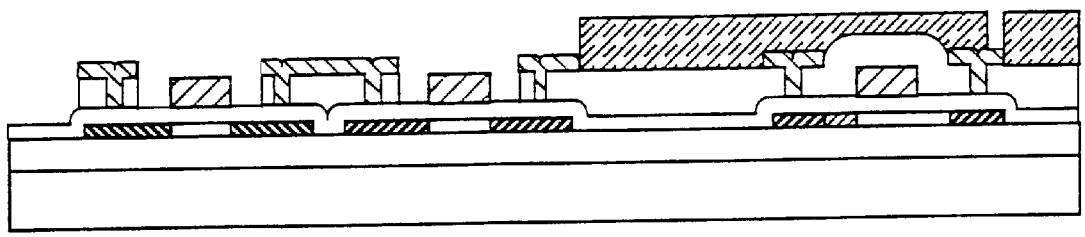

Subsequently, as shown in FIG. 15(A), the surface of the active matrix substrate surface is performed by dry etching to remove the polyimide film 526 from the top surfaces of the source/drain/gate lines for the driver circuit TFTs and, at the same time, to form contact holes reaching the electrode 525 of each pixel TFT.

Figure 15B:
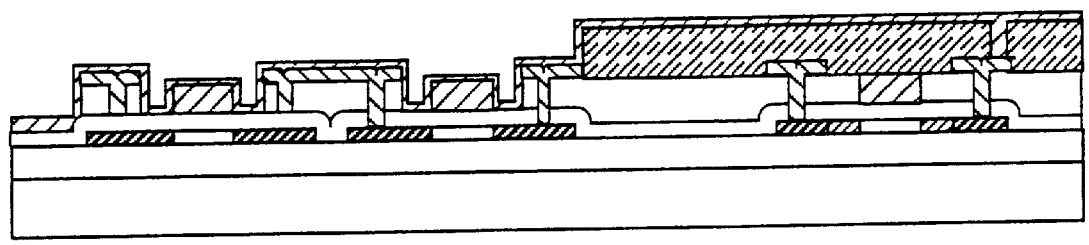
Figure 15C:
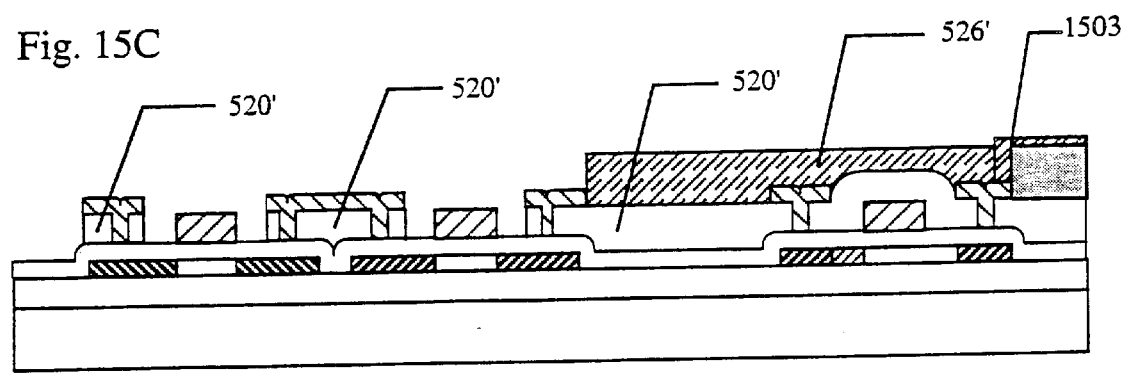

Then, an ITO (indium-tin oxide) film is formed to a thickness of 50 to 150 nm by sputtering process (FIG. 15(B)). Thereafter, the ITO film other than the pixel electrode 1503 is removed by wet etching and the pixel electrode 1503 is formed. As shown in FIG. 15(C), the source/gate lines for the driver circuit region still remain exposed to air.

Figure 16:
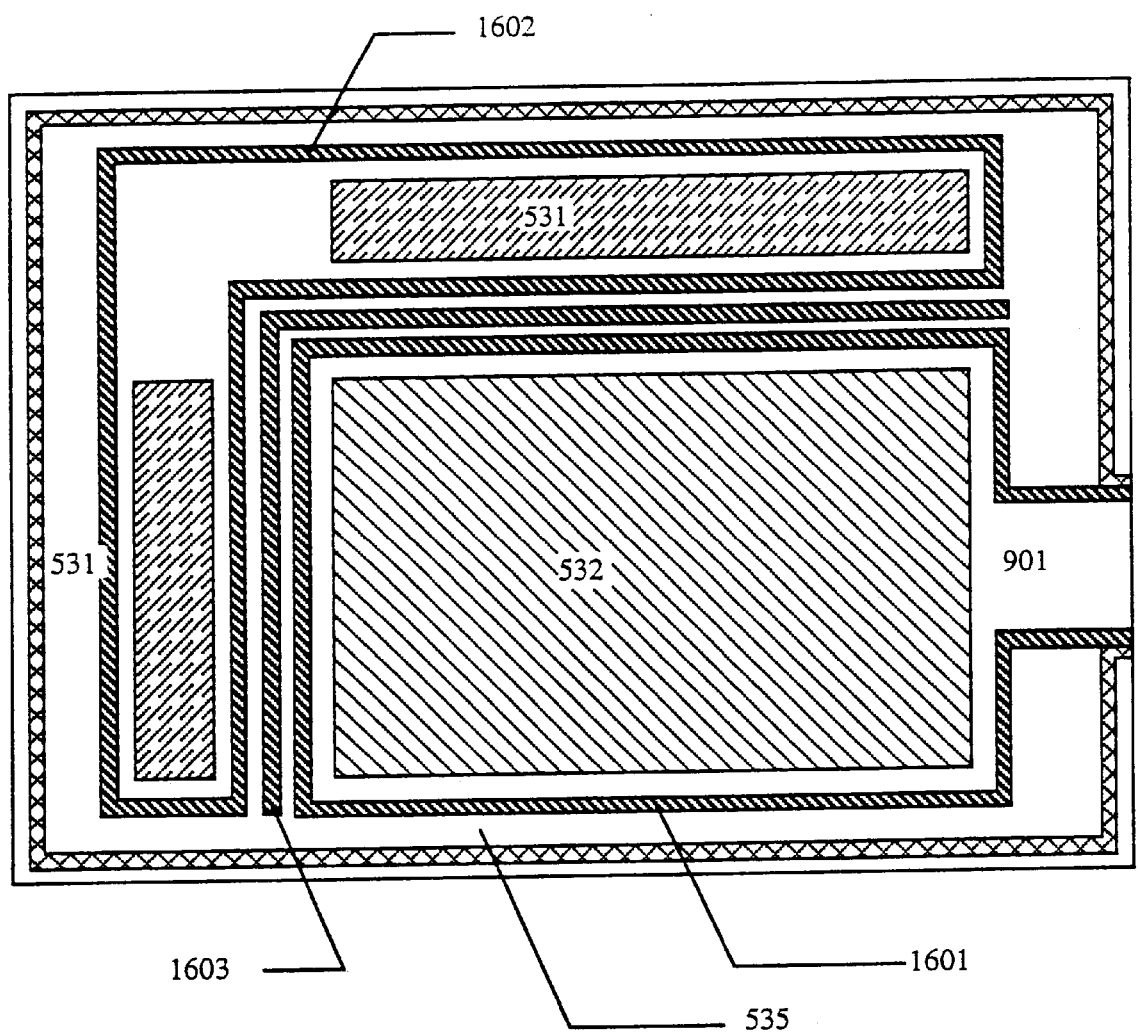
FIGS. 16, 17, and 18 are a top plan view of a liquid crystal display in accordance with the invention.

Subsequently, the gap retaining materials are formed. The method of forming the gap retaining materials is in the same manner as in the Embodiment 1, so that it is omitted here. In the present Embodiment 2, as shown in FIG. 16, the gap retaining material 1601 surrounding the pixel region 532, the gap retaining material 1602 surrounding the driver circuit region 531, and the gap retaining material 1603 between the driver circuit region 531 and the pixel region 532 are formed.

Then, an orientation film is applied by printing process on the active matrix substrate 535 and on the counter substrate to be mated with the active matrix substrate 535. However, on the active matrix substrate 535, the orientation film covers only the top portion of the pixel region 532 and it does not cover the top portion of the driver circuit region 531. Therefore, the source/gate lines for the driver circuit region 531 still remain exposed to air.

Thereafter, the surface of the counter substrate on which the orientation film was formed is rubbed in a given direction with a buff cloth having fibers (made of rayon, nylon, or the like) 2 to 3 mm long. In the present Embodiment, the active matrix substrate is not conducted rubbing treatment.

Then, a sealant is applied to the outer frame of the active matrix substrate. The active matrix substrate is mated with the counter substrate.

Subsequently, a liquid crystal material acting as a display medium is injected from the injecting hole 901. Thus, the liquid crystal material is held between the active matrix substrate and the counter substrate. By the continuous gap retaining material formed so as to surround the pixel region, it follows that the liquid crystal material is injected only into the pixel region. Consequently, no liquid crystal material is present in the driver circuit region.

Thereafter, a sealant is applied to the liquid material injecting hole and is cured by applying there to UV light. Thus, the liquid crystal material is completely sealed within the cell.

The liquid crystal display according to the present Embodiment yields the following advantages in addition to the advantages derived from the liquid crystal displays according to the Embodiment 1 or 2.

In the liquid crystal display according to the present Embodiment, the driver circuit region 531 is not coated with the polyimide film and so the source/drain lines and the gate lines are exposed to air. Therefore, the load capacitances on the source/drain lines and the gate lines are decreased. In consequence, crosstalk produced between source/drain lines adjacent or close to each other or between gate lines can be decreased greatly. Hence, the display characteristics can be improved greatly.

When the display characteristics were actually examined by using a fabricated cell, no interference patterns were observed at the cell surface. Also, no crosstalk was generated the displayed image was free of disclinations and hence was of good quality.

Although in the present Embodiment the top of the driver circuit region 531 is exposed to air, it suffices if an inert gas such as nitrogen is filled or if the active matrix substrate is mated with the counter substrate in an inert gas atmosphere.

EXAMPLE 4

Figure 17:
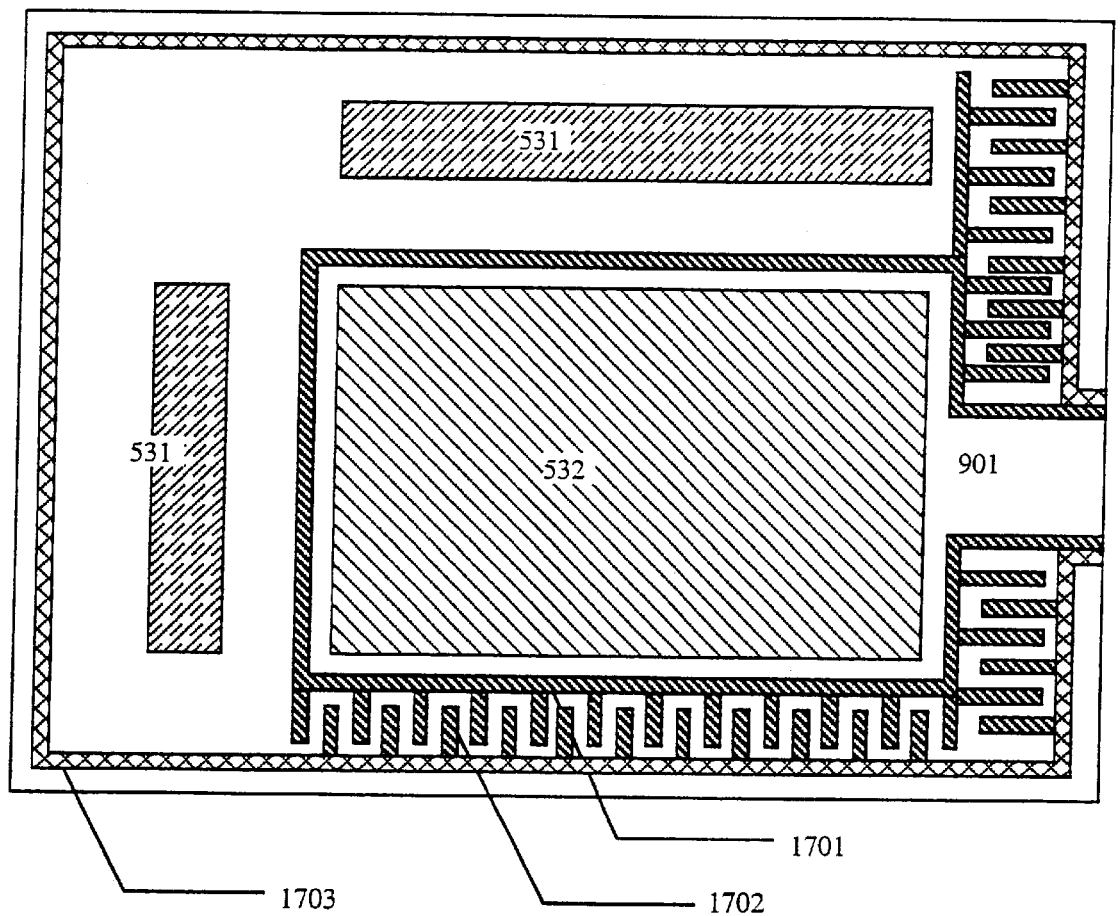
Figure 18:
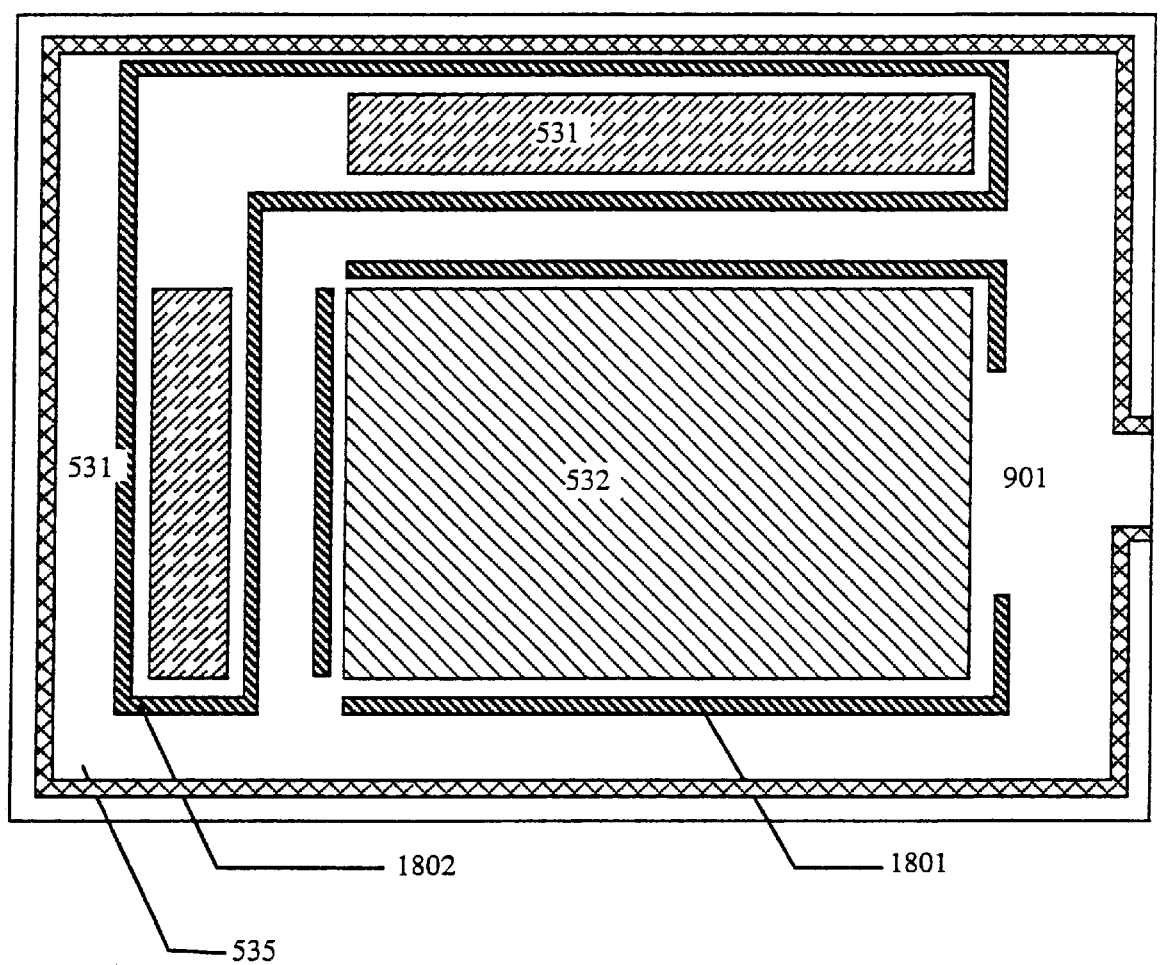

FIGS. 17 and 18 show other shapes of the gap retaining material according to the present invention. In FIG. 17, the gap retaining materials 1701, 1702 patterned in comb-like structure can prevent the liquid crystal material from entering into the driver circuit region 531, in case that the liquid crystal material leak from the liquid crystal injecting hole 901 and enter into a portion other than the pixel region 532. Further in FIG. 18, since the driver circuit region 531 is surrounded by the a gap retaining material 1802, it is possible to control the cell gap and prevent the liquid crystal material from entering into the driver circuit region 531, without completely surrounding the pixel region 532 by the gap retaining material 1801.

EXAMPLE 5

In the Embodiments 1–3, the present embodiment is described only in the case that the pixel electrodes are made of an ITO film (the transmissive type liquid crystal display).

However, it is needle to say that the invention can be applied also to a reflection type liquid crystal display by forming the pixel electrodes from a metal having high reflectivity such as Ti.

EXAMPLE 6

In the Embodiments 1–3, planar type TFTs are described by way of example. However of course, the invention is not affected by the structure of TFT. Therefore, each individual TFT in the pixel region and the driver circuit region may be an inverted staggered type or multigate type TFT.

Further, although not explicitly described in the Embodiments 1–3 mentioned above, color filters may be mounted on the counter substrate side, where color display is required. The color filters must have uniform thickness and be flat and have good excellent in heat resistance and chemical resistance.

In the Embodiments 1–3 mentioned above, the advantages of the gap retaining material according to the invention have been described with respect to the case that the height of the pixel region is higher than that of the driver circuit region. However, for those skilled in the art it will be understood that also in the case that the height of the driver circuit region is higher than that of the pixel region, the gap retaining material according to the invention offer the same advantages.

Furthermore, in the Embodiments 1–3 mentioned above, although the gap retaining material is formed on the active matrix substrate side, it may be formed on the counter substrate side. In addition, the gap retaining material may be formed on both active matrix substrate and counter substrate.

Additionally, the gap control by the gap retaining material according to the invention can confine the liquid crystal material only within the pixel region. Therefore, the invention can be also applied to a case in which a counter substrate is no necessary in a polymer dispersed system, i.e. liquid crystal display devices having a liquid crystal layer in which liquid crystal materials are dispersed in a high polymer material and liquid crystal devices of a lateral electric field modes.

What is claimed is:

1. A liquid crystal display at least comprising:
    a first substrate comprising a pixel region and a driver circuit region separate from said pixel region wherein said pixel region comprises a plurality of first TFTs (thin film transistors) and a plurality of pixel electrodes electrically connected with said first TFTs, and said driver circuit region comprises at least one driver circuit for driving said first TFTs, said driver circuit comprising a plurality of second TFTs;
    a second substrate opposite to said first substrate;
    a liquid crystal material held between said first and second substrates;
    a first gap retaining material for controlling a gap between said first and second substrates;
    a second gap retaining material for controlling said gap between said first and second substrates; and
    a sealant for sealing said liquid crystal between said first and second substrates,
    wherein said pixel region is surrounded by said first gap retaining material and said driver circuit region is surrounded by said second gap retaining material,
    wherein said pixel region is covered with an insulating film while said driver circuit region is exposed to one of air and an inert gas, and
    wherein an opening of said first gap retaining material for injecting said liquid crystal material is sealed.

2. The liquid crystal display of claim 1, wherein each of said first gap material and said second gap retaining material comprises a material selected from the group consisting of polyimide, acrylic, polyamide, and polyimidamide.

3. The liquid crystal display of claim 1, wherein each of said first gap retaining material and said second gap retaining material comprises a UV-curable resin or epoxy resin.

4. A liquid crystal display comprising:
    a first substrate comprising a pixel region and a driver circuit region separate from said pixel region wherein said pixel region comprises a plurality of pixel electrodes and a plurality of first TFTs electrically connected with said plurality of pixel electrodes, and said driver circuit region comprises at least one driver circuit for driving said first TFTs, said driver circuit comprising a plurality of second TFTs;
    a second substrate opposite to said first substrate;
    a liquid crystal material held between said first and second substrates;
    a first gap retaining material for controlling a gap between said first and second substrates;
    a second gap retaining material for controlling said gap between said first and second substrates; and
    a sealant for sealing said liquid crystal material between said first and second substrate,
    wherein said pixel region is surrounded by said first gap retaining material and said driver circuit region is surrounded by said second gap retaining material,
    wherein top surfaces of source lines for said plurality of second TFTs of said driver circuit contact a substance having a smaller dielectric constant than an insulating film on top surfaces of source lines for said plurality of first TFTs of said pixel region,
    wherein said pixel region is covered with an insulating film while said driver circuit region is exposed to one of air and an inert gas, and
    wherein an opening of said first gap retaining material for injecting said liquid crystal material is sealed.

5. The liquid crystal display of claim 4, wherein top surfaces of gate lines for said plurality of second TFTs of said driver circuit contact a substance having a smaller dielectric constant than an insulating film on top surfaces of said source lines and gate lines of said plurality of first TFTs of said pixel region.

6. The liquid crystal display of claim 4, wherein each of said first gap retaining material and said second gap retaining material comprises a material selected from the group consisting of polyimide, acrylic, polyamide, and polyimidamide.

7. The liquid crystal display of claim 4, wherein each of said first gap retaining material and said second gap retaining material comprises a UV-curable resin or epoxy resin.

8. The liquid crystal display of claim 1 or 4, wherein said pixel electrodes and said plurality of first TFTs electrically connected with said pixel electrodes are arranged in a matrix-like form.

9. The liquid crystal display according to claim 1 or 4 wherein each of said first gap retaining material and said second gap retaining material is formed by a separate step from said sealant.

10. A method of fabricating a liquid crystal display, at least comprising the steps of:
    forming a first substrate comprising a pixel region which at least comprise a plurality of first TFTs and a plurality of pixel electrodes electrically connected with said first TFTs and a driver circuit region which at least comprises at least one driver circuit comprising a plurality of second TFTs for driving said plurality of first TFTs and which are provided in a place different from said pixel region;

forming a second substrate opposite to said first substrate;

forming a first gap retaining material with an opening on said first substrate for controlling a gap between said first substrate and second substrates;

forming a second gap retaining material on said first substrate for controlling said gap between said first substrate and second substrates;

exposing top surfaces of source lines for said plurality of second TFTs;

forming a sealant at a periphery of at least one of said first and second substrates wherein said sealant is formed separately from each of said first and second gaps retaining materials;

mating said first substrate with second substrates;

injecting a liquid crystal material between said first and second substrates; and sealing said opening, wherein said pixel region is surrounded by said first gap retaining material and said driver circuit region is surrounded by said second gap retaining material, wherein said pixel region is covered with an insulating film while said driver circuit region is exposed to one of air and an inert gas.

11. The method of claim 10, further comprising the step of exposing top surfaces of gate lines of said plurality of second TFTs.

12. A liquid crystal display at least comprising:

a first substrate including a pixel region and at least one driver circuit region separate from said pixel region wherein said pixel region comprises a plurality of first TFTs and a plurality of pixel electrodes electrically connected with said first TFTs, and said driver circuit region comprises at least one driver circuit for driving said first TFTs, said driver circuit comprising a plurality of second TFTs;

a second substrate opposed to said first substrate;

a first gap retaining material formed on said substrate;

a second gap retaining material formed on said substrate;

a third gap retaining material formed on said substrate;

a liquid crystal layer in which a liquid crystal material is dispersed into a high polymer material, the liquid crystal layer held between said first and second substrates; and a sealant for sealing said liquid crystal layer between said first and second substrates, wherein said pixel region is surrounded by said first gap retaining material and said driver circuit region is surrounded by said second gap retaining material, wherein said pixel region is covered with an insulating film while said driver circuit region is exposed to one of air and an inert gas, and wherein an opening of said first gap retaining material for injecting said liquid crystal material is sealed.

13. A liquid crystal display comprising:

a first substrate including a pixel region and a driver circuit region separate from said pixel region wherein said pixel region comprises a plurality of pixels arranged in a matrix form, and each of said pixels is provided with a pixel electrode and a switching element for switching said pixel electrode, and said driver circuit region is provided with a driver circuit comprising a plurality of thin film transistors for driving said pixels;

a second substrate opposed to said first substrate;

a liquid crystal material disposed between said first and second substrates;

a first gap, retaining material for retaining a gap between said first and second substrates;

a sealant disposed at a periphery of said first and second substrates;

at least one second gap, retaining material connected to said first gap retaining material and provided between said first gap retaining material and said sealant; and at least one third gap retaining material connected to said sealant and provided between said first gap retaining material and said sealant, wherein said pixel region is surrounded by said first gap retaining material, wherein said pixel region is covered with an insulating film while said driver circuit region is exposed to one of air and an inert gas, and wherein an opening of said first gap retaining material for injecting said liquid crystal material is sealed.

14. The liquid crystal display according to claim 13 wherein said first gap retaining material is formed in a separate step from said sealant.

15. A method of manufacturing a liquid crystal display comprising the steps of:

preparing a first substrate comprising a pixel region and a driver circuit region separate from said pixel region wherein said pixel region comprises a plurality of pixels arranged in a matrix form, and each of said pixels is provided with a pixel electrode and a switching element for switching said pixel electrode, and said driver circuit region is provided with a driver circuit comprising a plurality of thin film transistors for driving said pixels;

preparing a second substrate opposed to said first substrate;

exposing top surfaces of source lines for said plurality of thin film transistors;

disposing a liquid crystal material between said first and second substrates;

disposing a first gap retaining material with an opening for retaining a gap between said first and second substrates;

disposing a second gap retaining material for retaining a gap between said first and second substrates;

disposing a third gap retaining material for retaining said gap between said first and second substrates;

disposing a sealant at a periphery of said first and second substrates wherein said sealant is formed separately from each of said first, second, and third gap retaining materials, wherein said pixel region is surrounded by said first gap retaining material and said driver circuit region is surrounded by said second gap retaining material, wherein each of said first, second, and third gap retaining materials is formed by patterning by irradiating a UV light through a photo mask, wherein said pixel region is covered with an insulating film while said driver circuit region is exposed to one of air and an inert gas, and wherein an opening of said first gap retaining material for injecting said liquid crystal material is sealed.

* * * * *